United States Patent
Wang et al.

(10) Patent No.: US 12,485,656 B2
(45) Date of Patent: Dec. 2, 2025

(54) MULTILAYER FILM

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Peter Niedersuss, Linz (AT)

(73) Assignee: BOREALIS AG, Vienna (AT)

( * ) Notice: Subject to any disclaimer, the term of this patent is extended or adjusted under 35 U.S.C. 154(b) by 263 days.

(21) Appl. No.: 17/833,052

(22) Filed: Jun. 6, 2022

(65) Prior Publication Data

US 2022/0297411 A1   Sep. 22, 2022

Related U.S. Application Data

(62) Division of application No. 17/273,372, filed as application No. PCT/EP2019/075299 on Sep. 20, 2019.

(30) Foreign Application Priority Data

Sep. 26, 2018  (EP) .................................... 18196881

(51) Int. Cl.
| | | |
|---|---|---|
| *B32B 27/08* | (2006.01) | |
| *B32B 27/32* | (2006.01) | |
| *C08F 210/06* | (2006.01) | |
| *C08L 23/08* | (2006.01) | |
| *C08L 23/14* | (2006.01) | |

(52) U.S. Cl.
CPC ............ *B32B 27/08* (2013.01); *B32B 27/325* (2013.01); *B32B 27/327* (2013.01); *C08F 210/06* (2013.01); *C08L 23/08* (2013.01); *C08L 23/142* (2013.01); *B32B 2250/03* (2013.01); *B32B 2250/246* (2013.01); *B32B 2270/00* (2013.01); *B32B 2307/31* (2013.01); *B32B 2553/00* (2013.01)

(58) Field of Classification Search
None
See application file for complete search history.

(56) References Cited

U.S. PATENT DOCUMENTS

| | | |
|---|---|---|
| 4,837,084 A | 6/1989 | Warren |
| 5,272,236 A | 12/1993 | Lai et al. |
| 2013/0167486 A1 | 7/2013 | Aarnio et al. |
| 2013/0203931 A1* | 8/2013 | Paavilainen ....... C09D 123/142 525/240 |
| 2014/0127487 A1 | 5/2014 | Fiebig et al. |
| 2015/0051346 A1 | 2/2015 | Reichelt et al. |
| 2017/0335078 A1* | 11/2017 | Defoer ................ B29C 48/0018 |

FOREIGN PATENT DOCUMENTS

| | | |
|---|---|---|
| CN | 102869718 A | 1/2013 |
| CN | 103068574 A | 4/2013 |
| CN | 103347951 A | 10/2013 |
| CN | 103890078 A | 6/2014 |
| CN | 104039550 A | 9/2014 |
| EP | 0887379 B1 | 12/2004 |
| EP | 2386603 A1 | 11/2011 |
| EP | 2415598 A1 | 2/2012 |
| EP | 2487203 A1 | 8/2012 |
| EP | 2586824 A1 | 5/2013 |
| EP | 2540496 B1 | 4/2014 |
| EP | 2540497 B1 | 8/2014 |
| EP | 3064548 A1 | 9/2016 |
| EP | 3257895 A1 | 12/2017 |
| JP | H0858042 A | 3/1996 |
| WO | 92/12182 A1 | 7/1992 |
| WO | 98/58976 A1 | 12/1998 |
| WO | 2011/0131639 A1 | 10/2011 |
| WO | 2013007650 A1 | 1/2013 |
| WO | 2015/0011135 A1 | 1/2015 |

OTHER PUBLICATIONS

Applicant: Borealis AG; "Propylene 1-Hexene Copolymer"; European Patent Application No. EP19196080; Extended European Search Report; Examiner Koen Bergmans; Sep. 25, 2019; 7 pgs.
Applicant: Borealis AG; European Application No. 19772728.2; European Office Action dated Mar. 17, 2022; 4 pgs.
Castignolles, Patrice, et al., "Detection and quantification of branching in polyacrylates by size-exclusion chromotography (SEC) and melt-state 13C NMR Spectroscopy", Polymer 50 (2009) 2373-2383.
Filip, Xenia, et al, "Heteronuclear Decoupling Under Fast MAS by a Rotor-Synchronized Hahn-Echo Pulse Train", Journal of Magnetic Rosonance 176 (2005) 239-243.
Griffin, John M., et al. "Low-Load Rotor-Synchronized Hahn-Echo Pulse Train (RS-HEPT) 1H Decoupling in Solid-State NMR:Factors Affecting MAS Spin-Echo Dephasing Times", Magn. Reson. Chem. 2007; 45:S198-S208.
Klimke, Katja, et al., "Optimisation and Application of Polyolefin Branch Quantification By Melt-State 13CNMR Spectroscopy", Macromol. Chem. Phys. 2006, 207, p. 382-395.
Liu, W., Rinaldi, P., McIntosh, L., Quirk, P., Macromolecules 2001, 34, 4757.
Parkinson, Matthew, et al., "Effect of Branch Length on 13C NMR Relation Properties in Molten Poly[ethylene-co-(alpha-olefin)] Model Systems", Macromol. Chem, Phys. 2007, 208-2128-2133.

(Continued)

*Primary Examiner* — Samir Shah
(74) *Attorney, Agent, or Firm* — Tarolli, Sundheim, Covell & Tummino LLP

(57) ABSTRACT

Multilayer film of at least three layers, one core layer and at least one sealing layer wherein the sealing layer comprises a linear low density polyethylene having a density in the range of 0.915 to 0.925 g/cm³, and the core layer comprises a propylene 1-hexene copolymer, said copolymer has an 1-hexene content in the range of 2.0 to 5.0 wt.-% and a xylene soluble fraction in the range of 0.3 to 15.0 wt.-%.

14 Claims, No Drawings

(56) References Cited

OTHER PUBLICATIONS

Pollard, M. Pollard, et al., "Observation of Chain Branching in Polyethylene in the Solid State and Melt Via 13C NMR Spectroscopy and Melt NMR Relation Time Measurements", Macromolecules 2004, 37, 813-825.
Qiu, X., Redwine, D., Gobbi, G., Nuamthanom, A., Rinaldi, P., Macromolecules 2007, 40, 6879.
Randall, James c., "A Review of High Resolution Liquid 13carbon Nuclear Magnetic Resonance Characterizations of Ethylene-Based Polymers", Journal of macromolecular science, C29():201 1989.
Resconi, Luigi, et al., "Selectivity in Propane Polymerization With Metallocene Catalysts", Chem. Rev. 2000, 100, 1253-1345.
Chinese Application No. 201980058464.9; Chinese Office Action Jul. 13, 2022; 9 pgs.
U.S. Appl. No. 17/273,372, filed Mar. 4, 2021; First Named Inventor: Jingbo WANG; Non-Final Office Action dated Sep. 26, 2022; 14 pgs.

* cited by examiner

MULTILAYER FILM

The present invention is directed to a multilayer film comprising at least one sealing layer (SL1) and one core layer (CL), said core layer containing a propylene 1-hexene copolymer having an 1-hexene content in the range of 2.0 to 5.0 wt.-%, based on the total weight of the propylene 1-hexene copolymer (PHC), and a xylene soluble fraction (XCS) determined at 25° C. according to ISO 16152 in the range of 0.3 to 15.0 wt.-% based on the total weight of the xylene soluble fraction (XCS) of the 1-hexene copolymer (PHC).

High standards are nowadays required for packing materials. Quite often properties are required in the packing industry, which are conflicting. Typically, high stiffness and toughness as well as excellent sealing behavior and good optics are required in parallel. To achieve these different properties seldom pure components, but rather combinations of different polymer components are used. Two different approaches mainly are at the skilled person's disposal: (a) blends of two or more polymers to form a heterophasic structure, or (b) producing a multilayer structure with different materials providing different functions. Both of them are applied in industry, the latter being even more popular since the choice of materials is more diverse without the need to consider the demanding technical questions of complex polymer blends. With multilayer structures known in the art already multilayer films with good properties for the packing industry are reached. One of the classic examples is e.g. the combination of two polyethylenes layers, one being a sealing layer based on a linear low density polyethylene (LLDPE) with density about 0.918 g/cm$^3$ and another being the core layer based on a medium density polyethylene (MDPE) or a linear low density polyethylene (LLDPE) with higher density which improves the mechanics. Such kind of combination has the weakness that an acceptable stiffness/toughness balance is reached at the expense of the optical properties due to the polyethylene with higher density.

Of course, also polypropylenes, especially polypropylene containing higher α-olefins, like 1-hexene, are used in film making for packaging material. Such polypropylenes show already good sealing properties and thus are typically used as a sealing layer in multilayer films. The overall performance of such multilayer films especially in view of the sealing behavior is, however, inferior compared to polyethylene multilayer systems.

Accordingly, the object of the present invention is to provide a multilayer film, especially an unoriented multilayer film, like a blown film, having excellent sealing properties paired with good optical performance and good mechanical, especially having a high stiffness and a high dart drop impact. Also a good hot tack force is additionally desired.

The finding of the present invention is to provide a multilayer film having a polyethylene based sealing layer and a core layer based on a propylene 1-hexene copolymer having a rather low xylene soluble content and a specific selected range of hexene content.

Accordingly the invention is directed to a film comprising at least three layers, one core layer (CL), one $1^{st}$ sealing layer (SL1) and one outer layer (OL), the stacking order of the at three layers is (SL1)/(CL)/(OL),
wherein
(a)
(a1) the $1^{st}$ sealing layer (SL1) comprises at least 90 wt.-%, based on the total weight of the sealing layer (SL1), of a $1^{st}$ base polymer composition (BC1), said $1^{st}$ base polymer composition (BC1) comprises at least 70 wt.-%, based on the total weight of the $1^{st}$ base polymer composition (BC1), of a $1^{st}$ linear low density polyethylene (LLDPE1), said $1^{st}$ linear low density polyethylene (LLDPE1) having a density in the range of 0.890 to 0.925 g/cm$^3$;
or preferably
(a2) the $1^{st}$ sealing layer (SL1) comprises at least 90 wt.-%, based on the total weight of the $1^{st}$ sealing layer (SL1), of the $1^{st}$ base polymer composition (BC1), and the remaining part up to 100 wt.-%, based on the total weight of the $1^{st}$ sealing layer (SL1), are additives (AD), preferably the additives (AD) are selected from the group consisting of antioxidants, light stabilizers, acid scavengers, processing aids, anti-blocking aids, nucleating agents, slip agents and mixtures thereof,
wherein further said $1^{st}$ base polymer composition (BC1) comprises at least 70 wt.-%, based on the total weight of the $1^{st}$ base polymer composition (BC1), of a $1^{st}$ linear low density polyethylene (LLDPE1), said $1^{st}$ linear low density polyethylene (LLDPE1) having a density in the range of 0.890 to 0.925 g/cm$^3$;
(b)
(b1) the core layer (CL) comprises at least 90 wt.-%, based on the total weight of the core layer (CL), of a $2^{nd}$ base polymer composition (BC2), said $2^{nd}$ base polymer composition (BC2) comprises at least 75 wt.-%, based on the total weight of the $2^{nd}$ base polymer composition (BC2), of a propylene 1-hexene copolymer (PHC);
preferably
(b2) the core layer (CL) comprises at least 90 wt.-%, based on the total weight of the core layer (CL), of a $2^{nd}$ base polymer composition (BC2), said $2^{nd}$ base polymer composition (BC2) consists of a propylene 1-hexene copolymer (PHC);
still more preferably
(b3) the core layer (CL) comprises at least 90 wt.-%, based on the total weight of the core layer (CL), of a $2^{nd}$ base polymer composition (BC2), said $2^{nd}$ base polymer composition (BC2) comprises
75 to 95 wt.-%, based on the total weight of the $2^{nd}$ base polymer composition (BC2), of a propylene 1-hexene copolymer (PHC), and
5 to 25 wt.-%, based on the total weight of the $2^{nd}$ base polymer composition (BC2), of a plastomer (PL), said plastomer being an elastomeric copolymer of ethylene and at least one $C_4$ to $C_{10}$ α-olefin;
yet more preferably
(b4) the core layer (CL) comprises at least 90 wt.-%, based on the total weight of the core layer (CL), of a $2^{nd}$ base polymer composition (BC2), and the remaining part up to 100 wt.-%, based on the total weight of the core layer (CL), are additives (AD), preferably the additives (AD) are selected from the group consisting of antioxidants, light stabilizers, acid scavengers, processing aids, anti-blocking aids, nucleating agents, slip agents and mixtures thereof,
wherein further said $2^{nd}$ base polymer composition (BC2) comprises at least 75 wt.-%, based on the total weight of the $2^{nd}$ base polymer composition (BC2), of a propylene 1-hexene copolymer (PHC);
still yet more preferably
(b5) the core layer (CL) comprises at least 90 wt.-%, based on the total weight of the core layer (CL), of a $2^{nd}$ base polymer composition (BC2), and the remaining part up to 100 wt.-%, based on the total weight of the core layer (CL), are additives (AD), preferably the additives (AD) are selected from the group consisting of antioxidants, light stabilizers, acid scavengers, processing aids, anti-blocking aids, nucleating agents, slip agents and mixtures thereof, wherein further said $2^{nd}$ base polymer composition (BC2) consists of the propylene 1-hexene copolymer (PHC);

most preferably (b6) the core layer (CL) comprises at least 90 wt.-%, based on the total weight of the core layer (CL), of a $2^{nd}$ base polymer composition (BC2), and the remaining part up to 100 wt.-%, based on the total weight of the core layer (CL), are additives (AD), preferably the additives (AD) are selected from the group consisting of antioxidants, light stabilizers, acid scavengers, processing aids, anti-blocking aids, nucleating agents, slip agents and mixtures thereof, wherein further said $2^{nd}$ base polymer composition (BC2) comprises, preferably consists of, 75 to 95 wt.-%, based on the total weight of the $2^{nd}$ base polymer composition (BC2), of a propylene 1-hexene copolymer (PHC), and 5 to 25 wt.-%, based on the total weight of the $2^{nd}$ base polymer composition (BC2), of a plastomer (PL), said plastomer being an elastomeric copolymer of ethylene and at least one $C_4$ to $C_{10}$ α-olefin;

and (c)

(c1) the outer (OL) comprises at least 90 wt.-%, based on the total weight of the outer (OL), of a $3^{rd}$ base polymer composition (BC3), said $3^{rd}$ base polymer composition (BC3) comprises at least 90 wt.-%, based on the total weight of the $3^{rd}$ base polymer composition (BC3), of a polyolefin;

or preferably (c2) the outer (OL) comprises at least 90 wt.-%, based on the total weight of the outer (OL), of a $3^{rd}$ base polymer composition (BC3), and the remaining part up to 100 wt.-%, based on the total weight of the outer (OL), are additives (AD), preferably the additives (AD) are selected from the group consisting of antioxidants, light stabilizers, acid scavengers, processing aids, anti-blocking aids, nucleating agents, slip agents and mixtures thereof, wherein further said $3^{rd}$ base polymer composition (BC3) comprises at least 90 wt.-%, based on the total weight of the $3^{rd}$ base polymer composition (BC3), of a polyolefin;

wherein said propylene 1-hexene copolymer (PHC) of the $2^{nd}$ base polymer composition (BC2) has (i) an 1-hexene content in the range of 2.0 to 5.0 wt.-%, preferably in the range of 2.5 to less than 4.5 wt.-%, more preferably in the range of 2.5 to less than 4.0 wt.-%, based on the total weight of the propylene 1-hexene copolymer (PHC), and (ii) a xylene soluble fraction (XCS) determined at 25° C. according to ISO 16152 in the range of 0.3 to 15.0 wt.-%, preferably in the range of 0.3 to 9.5 wt.-%, based on the total weight of the xylene soluble fraction (XCS) of the propylene 1-hexene copolymer (PHC).

Further preferred embodiments are defined in the dependent claims.

In the following, the invention will be described in more detail.

The term "base polymer composition (BC)", like "$1^{st}$ base polymer composition (BC1)", "$2^{nd}$ base polymer composition (BC2)" or "$3^{rd}$ base polymer composition (BC3)", indicates that said composition contains just polymers, preferably just polyolefins, like the propylene 1-hexene copolymer (PHC) and optionally the plastomer (PL). Accordingly, the term "base polymer composition" excludes for instance the presence of additives in said compositions. However said base polymer compositions may of course contain typical impurities, like for instance catalyst impurities resulting from the polymerization process. Such impurities are regarded part of the polymer and will not exceed 2 wt.-% based on the total weight of the base polymer composition.

The Multilayer Film

The present invention is directed to a multilayer film comprising at least three layers, one $1^{st}$ sealing layer (SL1), one core layer (CL) and one outer layer (OL).

The stacking order of the at least three layers is $1^{st}$ sealing layer (SL1)/core layer (CL)/outer layer (OL).

The multilayer film may comprise further layers, for instance between the $1^{st}$ sealing layer (SL1) and the core layer (CL) and/or between the core layer (CL) and the outer layer (OL). Accordingly, the total number of layers may be up to 9, like 8, 7, 6, 5 or 4 layers. However it is preferred that the multilayer film consists of 5 layers, more preferably 3 layers. Thus in one preferred embodiment the multilayer film consists of one $1^{st}$ sealing layer (SL1), one core layer (CL) and one outer layer (OL).

In one embodiment the multilayer film may comprise one $1^{st}$ sealing layer (SL1), one core layer (CL) and one outer layer (OL), wherein the outer layer (OL) is preferably a heat shield layer (HSL) or a $2^{nd}$ sealing layer (SL2) as defined below, the latter being preferred, wherein further the $1^{st}$ sealing layer (SL1) is joined on one side of the core layer (CL) and the outer layer (OL) is joined on the other side of the core layer (CL), wherein still more preferably the $1^{st}$ sealing layer (SL1) and the outer layer (OL) form the outermost layers of the multilayer film.

Preferably, the $1^{st}$ sealing layer (SL1) forms on one side of the multilayer film the outermost layer, i.e. the surface. The outer layer (OL) may not be necessarily the outermost layer (surface) on the other side of the multilayer film, but further layer(s) (FL(s)) opposite to the core layer (CL) may follow the outer layer (OL), wherein one of the further layers (FLs) form the outermost layer (surface). Accordingly, the stacking order may in such a case $1^{st}$ sealing layer (SL1)/core layer (CL)/outer layer (OL)/further layer(s) (FL(s)).

In one preferred embodiment the multilayer film consists of the $1^{st}$ sealing layer (SL1), the core layer (CL) and the outer layer (OL), wherein the stacking order of the three layers is $1^{st}$ sealing layer (SL1)/core layer (CL)/outer layer (OL).

In such a case, the $1^{st}$ sealing layer (SL1) and the outer layer (OL) are the outermost layers, i.e. the surface layers of the multilayer film.

As mentioned in detail below the outer layer (OL) can be a heat shield layer (HSL) or a $2^{nd}$ sealing layer (SL2), the latter being preferred. Accordingly, it is preferred that the multilayer film comprises at least (a) one $1^{st}$ sealing layer (SL1), one core layer (CL) and one $2^{nd}$ sealing layer (SL2) wherein the stacking order of the at least three layers is $1^{st}$ sealing layer (SL1)/core layer (CL)/$2^{nd}$ sealing layer (SL2) wherein preferably the $1^{st}$ sealing layer (SL1) and the $2^{nd}$ sealing layer (SL2) form the outermost layers, i.e. the surface layers of the multilayer film;

or (b) one $1^{st}$ sealing layer (SL1), one core layer (CL) and one heat shield layer (HSL) wherein the stacking order of the at least three layers is $1^{st}$ sealing layer (SL1)/core layer (CL)/heat shield layer (HSL)

wherein preferably the $1^{st}$ sealing layer (SL1) and the heat shield layer (HSL) form the outermost layers, i.e. the surface layers of the multilayer film.

In a specific preferred embodiment the multilayer film consists of (a) one $1^{st}$ sealing layer (SL1), one core layer (CL) and one $2^{nd}$ sealing layer (SL2) wherein the stacking order of the at least three layers is $1^{st}$ sealing layer (SL1)/core layer (CL)/$2^{nd}$ sealing layer (SL2)

wherein the $1^{st}$ sealing layer (SL1) and the $2^{nd}$ sealing layer (SL2) form the outermost layers, i.e. the surface layers of the multilayer film;

or (b) one $1^{st}$ sealing layer (SL1), one core layer (CL) and one heat shield layer (HSL) wherein the stacking order of the at least three layers is $1^{st}$ sealing layer (SL1)/core layer (CL)/heat shield layer (HSL)

wherein the $1^{st}$ sealing layer (SL1) and the heat shield layer (HSL) form the outermost layers, i.e. the surface layers of the multilayer film.

Preferably the multilayer film has a thickness in the range of 20 to 300 μm, more preferably in the range of 25 to 250 μm, still more preferably in the range of 30 to 200 μm, more preferably in the range of 35 to 150 μm, like in the range of 35 to 100 μm.

Preferably the multilayer film is an unstretched film. The term "unstretched" shall indicated that the multilayer film is not dimensionally stretched as this is the case for biaxially oriented films. Accordingly it is preferred that the multilayer film according to this invention is not biaxially stretched or uniaxially stretched. "Stretching" is a processing step which stretches the film more than a film is stretched due to normal drawing effects caused by film making. For instance, a film in a cast film line is drawn and thus slightly stretched in machine direction. A similar effect occurs in a blown film line where the bubble is drawn. However such drawing effects are not understood as stretching. Stretching is more than the drawing occurring in the cast film line or blown film line. Accordingly, the inventive multilayer film is non-stretched and thus the multilayer film according to this invention is a cast film or a blown film, the latter being preferred. In case the multilayer film is produced on a blown film line, the cooling of the multilayer film can be effected by water cooling or air cooling, the latter being preferred.

The preparation of a multilayer cast or blown films is state of the art and not part of the invention. For instance a multilayer blown film is obtained by a blown film coextrusion process. In the blown film coextrusion process the melts of the polymer materials for the core layer (CL), for the $1^{st}$ sealing layer (SL1), for the outer layer (OL) and optionally for all further layers are extruded through an annular die and blown into a tubular film by forming a bubble which is collapsed between nip rollers after solidification. The blown coextrusion can be preferably effected at a temperature in the range 160 to 240° C., and cooled by water or preferably by blowing gas (generally air) at a temperature of 10 to 50° C. to provide a frost line height of 0.5 to 8 times the diameter of the die. The blow up ratio should generally be in the range of from 1.5 to 4.0, such as from 2.0 to 4.0, preferably 2.5 to 3.5.

Optionally one or both, surface(s) of the multilayer blown film can be corona- or flame-treated by one of the known methods. For the corona treatment, the film is passed between two conductor elements serving as electrodes, with such a high voltage, usually an alternating voltage (about 10000 V and 10000 Hz), being applied between the electrodes that spray or corona discharges can occur. Due to the spray or corona discharge, the air above the film surface is ionized and reacts with the molecules of the film surface, causing formation of polar inclusions in the essentially non-polar polymer matrix. The treatment intensities are in the usual range, preferably from 38 to 48 dynes/cm after production.

Core Layer (CL)

As defined above the multilayer film of this invention must comprise one core layer (CL). The term "core layer (CL)" is understood herein as used in the technical field of packaging, i.e. the term "core layer (CL)" indicates that this layer forms the middle part of the multilayer film and contributes especially to the mechanical and optical properties. However, in the present case the specific selection of the "core layer (CL)" additionally improves the sealing behavior of the sealing layer(s). The term "core layer (CL)" further indicates that this layer is typically the thickest layer in the multilayer film.

According it is preferred that the thickness of the core layer (CL) is preferably in the range of 5 to 250 μm, more preferably in the range of 10 to 200 μm, yet more preferably in the range of 10 to 100 μm.

Further, although the phrase "core layer" is singular, it may refer to one or more layers, like to 2 to 5 layers, i.e. 2, 3, 4, or 5 layers, that form the core layer (CL) of the multilayer film. However, each of the layers forming together the "core layer" are chemically identical, i.e. have been produced with the same material. Thus for this reason the core layer (CL) is singular although in some embodiments the core layer (CL) may comprise several layers all of them produced with the identical material, i.e. the material defined in more detail below.

The core layer (CL) comprises at least 90 wt.-%, based on the total weight of the core layer (CL), of a $2^{nd}$ base polymer composition (BC2). Preferably, the core layer (CL) contains the $2^{nd}$ base polymer composition (BC2) as the only polymer. Accordingly it is preferred that the core layer (CL) comprises at least 90 wt.-%, more preferably at least 95 wt.-%, yet more preferably at least 98 wt.-%, based on the total weight of the core layer (CL), of the $2^{nd}$ base polymer composition (BC2) and the remaining part up to 100 wt.-%, based on the total weight of the core layer (CL), are additives (AD). Typical additives (AD) present in the core layer (CL) are antioxidants, light stabilizers, acid scavengers, processing aids, anti-blocking aids, nucleating agents and slip agents. Such additives are known in the art, see for instance Hans Zweifel at all "Plastics Additives Handbook", 6th edition, and do not contribute to the invention.

The $1^{st}$ Sealing Layer (SL1)

As mentioned above the multilayer film of this invention must comprise one $1^{st}$ sealing layer (SL1).

The term "sealing layer" is understood herein as used in the technical field of packaging, i.e. the term "sealing layer" indicates that said layer can be used for sealing purposes, i.e. on the surface of this layer or part of this layer the sealing can take place.

Hence it is preferred that the $1^{st}$ sealing layer (SL1) forms the outermost layer of the multilayer film, forms one of the two surfaces of the multilayer film. Still more preferably the $1^{st}$ sealing layer (SL1) is attached, i.e. joined, to the core layer (CL) of the multilayer film. Yet more preferably the $1^{st}$ sealing layer (SL1) forms one of the outermost layers of the multilayer film and is attached to the core layer (CL) of the multilayer film.

Preferably, the $1^{st}$ sealing layer (SL1) has a thickness which is substantially less than the thickness of the core layer (CL) and substantially less than the thickness of the total multilayer film. In one embodiment the thickness of the $1^{st}$ sealing layer (SL) is substantially less, usually less than 20%, of the thickness of the core layer (CL). Accordingly, it is appreciated that the $1^{st}$ sealing layer (SL1) has a thickness in the range of 0.5 to 40 μm, more preferably in the range of 1.0 to 30 μm.

As mentioned above in a preferred embodiment the outer layer (OL) is a $2^{nd}$ sealing layer (SL2) (see further definition below). In such a case it is especially preferred that the $1^{st}$ sealing layer (SL1) and the $2^{nd}$ sealing layer (SL2) are chemically identical, i.e. have been produced with the same material.

The thickness of the $1^{st}$ sealing layer (SL1) and the $2^{nd}$ sealing layer (SL1) must not necessarily the same, however it is preferred that they have a similar thickness +/−10% variation.

The $1^{st}$ sealing layer (SL1) comprises at least 90 wt.-%, based on the total weight of the $1^{st}$ sealing layer (SL1), of a $1^{st}$ base polymer composition (BC1). Preferably, the $1^{st}$ sealing layer (SL1) contains the $1^{st}$ base polymer composition (BC1) as the only polymer. Accordingly it is preferred that the $1^{st}$ sealing layer (SL1) comprises at least 90 wt.-%, more preferably at least 95 wt.-%, yet more preferably at least 98 wt.-%, based on the total weight of the $1^{st}$ sealing layer (SL1), of the $1^{st}$ base polymer composition (BC1) and the remaining part up to 100 wt.-%, based on the total weight of the $1^{st}$ sealing layer (SL1), are additives (AD). Typical additives (AD) present in the $1^{st}$ sealing layer (SL1) are antioxidants, light stabilizers, acid scavengers, processing aids, anti-blocking aids, nucleating agents and slip agents. Such additives are known in the art, see for instance Hans Zweifel at all "Plastics Additives Handbook", $6^{th}$ edition, and do not contribute to the invention.

Concerning the definition of the $1^{st}$ base polymer composition (BC1) it is referred to the information below.

In case the multilayer film comprises a $1^{st}$ sealing layer (SL1) and a $2^{nd}$ sealing layer (SL2) it is preferred that the base polymer compositions of both sealing layers (SL1) and (SL2) are the same. In other words, it is preferred that the $1^{st}$ base polymer composition (BC1) and the $3^{rd}$ base polymer composition (BC3A) are the same in case multilayer film comprises one $1^{st}$ sealing layer (SL1) and one $2^{nd}$ sealing layer (SL2).

The Outer (OL)

As mentioned above the third mandatory layer is the outer layer (OL). The outer layer can have any function in the multilayer film according to this invention. However it is preferred that the outer layer is either a heat shield layer (HSL) or the $2^{nd}$ sealing layer (SL2), the latter being preferred.

Preferably the outer layer (OL), e.g. the heat shield layer (HSL) or the $2^{nd}$ sealing layer (SL2), is an outermost layer.

Preferably the outer layer (OL), e.g. the heat shield layer (HSL) or the $2^{nd}$ sealing layer (SL2), has a thickness that is substantially less than the thickness of the core layer (CL) and substantially less than the thickness of the total multilayer film. In one embodiment the thickness of the outer layer (OL), e.g. the heat shield layer (HSL) or the $2^{nd}$ sealing layer (SL2), is substantially less, usually less than 20%, of the thickness of the core layer (CL). Accordingly it is appreciated that the outer layer (OL), e.g. the heat shield layer (HSL) or the $2^{nd}$ sealing layer (SL2), has a thickness in the range of 0.5 to 40 μm, more preferably in the range of 1.0 to 30 μm.

The outer layer (OL) comprises at least 90 wt.-%, based on the total weight of the outer layer (OL), of a $3^{rd}$ base polymer composition (BC3). Preferably, the outer layer (OL) contains the $3^{rd}$ base polymer composition (BC3) as the only polymer. Accordingly it is preferred that the outer layer (OL) comprises at least 90 wt.-%, more preferably at least 95 wt.-%, yet more preferably at least 98 wt.-%, based on the total weight of the outer layer (OL), of the $3^{rd}$ base polymer composition (BC3) and the remaining part up to 100 wt.-%, based on the total weight of the outer layer (OL), arc additives (AD). Typical additives (AD) present in the outer layer (OL) are antioxidants, light stabilizers, acid scavengers, processing aids, anti-blocking aids, nucleating agents and slip agents. Such additives are known in the art, see for instance Hans Zweifel at all "Plastics Additives Handbook", $6^{th}$ edition, and do not contribute to the invention.

As mentioned above the outer layer (OL) is preferably a heat shield layer (HSL) or the $2^{nd}$ sealing layer (SL2), the latter being preferred. Accordingly, the information provided in the previous paragraph is especially applicable in case the outer layer (OL) is either a heat shield layer (HSL) or the $2^{nd}$ sealing layer (SL2).

Regarding the definition of a sealing layer it referred to the information provided for the $1^{st}$ sealing layer (SL1).

The term "head shield layer" is understood as known in the art in this technical field, i.e. as a layer which does not melt during heat sterilization.

In case the outer layer (OL) is a heat shield layer (HSL), the $3^{rd}$ base polymer composition (BC3) is preferably the $3^{rd}$ base polymer composition (BC3B) and in case the outer layer (OL) is the $2^{nd}$ sealing layer (SL2), the $3^{rd}$ base polymer composition (BC3) is preferably the $3^{rd}$ base polymer composition (BC3A) as defined in detail below.

$2^{nd}$ Base Polymer Composition (BC2)

As mentioned above the term "$2^{nd}$ base polymer composition (BC2)" indicates that said composition contains just polymers, preferably just polyolefins, still more preferably just propylene copolymers and ethylene copolymers. One of the polymers must be the propylene 1-hexene copolymer (PHC) as defined in more detail below. A further polymer which might be present in the "$2^{nd}$ base polymer composition (BC2)" is a plastomer (PL) as defined in more detail below. Accordingly it is preferred that $2^{nd}$ base polymer composition (BC2) comprises at least 75 wt.-%, more preferably at least 80 wt.-%, yet more preferably at least 85 wt.-%, still yet more preferably at least 90 wt.-%, based on the total weight of the $2^{nd}$ base polymer composition (BC2), of the propylene 1-hexene copolymer (PHC) and the remaining part up to 100 wt.-%, based on the total weight of the $2^{nd}$ base polymer composition (BC2), are polymers, preferably polyolefins, more preferably polyethylenes, like polyethylene copolymers, e.g. the plastomer (PL) as defined in detail below, and/or propylene copolymers, other than the propylene 1-hexene copolymer (PHC).

Accordingly in one embodiment the $2^{nd}$ base polymer composition (BC2) consists of the propylene 1-hexene copolymer (PHC).

In a more preferred embodiment the $2^{nd}$ base polymer composition (BC2) comprises, preferably consists of, (a) 75 to 95 wt.-%, preferably 80 to 95 wt.-%, more preferably 85 to 95 wt.-%, still more preferably 88 to 93 wt.-%, based on the total weight of the $2^{nd}$ base polymer composition (BC2), of the propylene 1-hexene copolymer (PHC) and (b) 5 to 25 wt.-%, preferably 5 to 20 wt.-%, more preferably 5 to 15 wt.-%, still more preferably 7 to 12 wt.-%, based on the total weight of the $2^{nd}$ base polymer composition (BC2), of the plastomer (PL) as defined herein.

In case the $2^{nd}$ base polymer composition (BC2) comprises in addition to the propylene 1-hexene copolymer (PHC) other polymers the $2^{nd}$ base polymer composition (BC2) is obtained by typical (melt) blending as known in the art.

The Propylene 1-Hexene Copolymer (PHC)

The propylene 1-hexene copolymer (PHC) according to this invention has a 1-hexene content in the range of 2.0 to 5.0 wt.-%, more preferably in the range of 2.5 to less than 4.5 wt.-%, still more preferably in the range of 2.5 to 4.0 wt.-%. Throughout the present invention, the amount of 1-hexene for the propylene 1-hexene copolymer (PHC) is calculated based on the total amount of the propylene 1-hexene copolymer (PHC).

The term "propylene 1-hexene copolymer" according to this invention indicates the propylene 1-hexene copolymer contains only units derivable from propylene and 1-hexene. The term "propylene 1-hexene copolymer" excludes also the option that a propylene homopolymer can be present. In other words the term "propylene 1-hexene copolymer" defines a polymer which contains solely propylene 1-hexene copolymer chains.

The propylene 1-hexene copolymer (PHC) according to this invention is featured by a rather moderate to low xylene soluble fraction (XCS). Accordingly, the propylene 1-hexene copolymer (PHC) has a xylene soluble fraction (XCS) determined at 25° C. according to ISO 16152 in the range of 0.3 to 15.0 wt.-%, preferably in the range 0.3 to 9.5 wt.-%, more preferably in the range of 0.4 to 6.0 wt.-%, still more preferably in the range of 0.4 to 5.0 wt.-%, still yet more preferably in the range of 0.4 to 4.0 wt.-%, based on the total weight of the xylene soluble fraction (XCS) of the propylene 1-hexene copolymer (PHC).

Further it is preferred that the xylene soluble fraction (XCS) of the propylene 1-hexene copolymer (PHC) has a 1-hexene content in the range of 2.5 to 7.0 wt.-%, more preferably 2.8 to 6.0 wt.-%, yet more preferably 3.0 to 5.0 wt.-%, based on the total weight of the xylene soluble fraction (XCS) of the propylene 1-hexene copolymer (PHC).

Further it is preferred that the propylene 1-hexene copolymer (PHC) has a rather narrow molecular weight distribution. Accordingly it is preferred that the propylene 1-hexene copolymer (PHC) has a molecular weight distribution (Mw/Mn) as characterized by the ratio between the weight average molecular weight and the number average molecular weight, of not more than 4.5, more preferably not more than 4.3, yet more preferably in the range of 2.5 to 4.5, still more preferably in the range of 3.0 to 4.3, still yet more preferably in the range of 3.3 to 4.0.

Furthermore, it is preferred that the propylene 1-hexene copolymer (PHC) has a melt flow rate MFR$_2$ (230° C., 2.16 kg) measured according to ISO 1133 in the range of 0.3 to 15.0 g/10 min, more preferably in the range of 0.5 to 8.0 g/10 min, still more preferably in the range of 1.0 to 5.0 g/10 min.

Preferably the propylene 1-hexene copolymer (PHC) has been produced by a metallocene catalyst. Typical polypropylenes produced by a metallocene catalyst are featured by a rather high number of head to head insertions, leading to so called 2,1 erythro defects. Accordingly it is preferred that the propylene 1-hexene copolymer (PHC) has 2,1 erythro regio defects of at least 0.30 mol.-%, more preferably of at least 0.40 mol.-%, still more preferably in the range of 0.30 to 0.60 mol.-%, yet more preferably in the range of 0.35 to 0.58 mol.-%, still more preferably in the range of 0.40 to 0.55 mol.-%, like in the range of 0.42 to 0.53 mol.-%. The amount of 2,1 erythro regio defects is calculated based on the total propylene 1-hexene copolymer (PHC).

The melting temperature ($T_m$) of the propylene 1-hexene copolymer (PHC) is preferably at least 130° C., more preferably of at least 133° C. Thus, it is in particular appreciated that the melting temperature ($T_m$) of the propylene 1-hexene copolymer (PHC) is in the range of 130 to 145° C., more preferably in the range of 133 to 142° C., like in the range of 133 to 139° C.

The propylene 1-hexene copolymer (PHC) is further defined by its polymer fractions present.

Accordingly, the propylene 1-hexene copolymer (PHC) comprises at least two fractions, namely a $1^{st}$ propylene 1-hexene copolymer (PHC-1) and a $2^{nd}$ propylene 1-hexene copolymer (PHC-2). Preferably that the total amount of the propylene 1-hexene copolymers (PHC-1) and (PHC-2) together is at least 90 wt.-%, more preferably at least 95 wt.-%, yet more preferably at least 98 wt.-%, based on the total weight of the propylene 1-hexene copolymer (PHC). In a specific embodiment the propylene 1-hexene copolymer (PHC) consists of the $1^{st}$ propylene 1-hexene copolymer (PHC-1) and the $2^{nd}$ propylene 1-hexene copolymer (PHC-2).

In addition it is preferred that the weight ratio [(PHC-1)/(PHC-2)] between the propylene 1-hexene copolymers (PHC-1) and (PHC-2) is in the range of 20/80 to 80/20, more preferably in the range of 25/75 to 60/40, yet more preferably in the range of 30/70 to 50/50.

Further the $1^{st}$ propylene 1-hexene copolymer (PHC-1) is the 1-hexene lean fraction whereas the $2^{nd}$ propylene 1-hexene copolymer (PHC-2) is the 1-hexene rich fraction.

Accordingly it is preferred that the $1^{st}$ propylene 1-hexene copolymer (PHC-1) has a 1-hexene content in the range of 0.5 to 3.3 wt.-%, more preferably in the range of 0.6 to 3.0 wt.-%, yet more preferably in the range of 0.7 to 2.5 wt.-%. Throughout the present invention, the amount of 1-hexene for the $1^{st}$ propylene 1-hexene copolymer (PHC-1) is calculated based on the total weight of the $1^{st}$ propylene 1-hexene copolymer (PHC-1).

Therefore it is especially preferred that the propylene 1-hexene copolymer (PHC) fulfills the inequation (1), still more preferably the inequation (1a), yet more preferably the inequation (Ib), still yet more preferably the inequation (Ic), $$\frac{C6(PHC)}{C6(PHC-1) * \frac{[PHC-1]}{[PHC]}} \geq 5.00; \quad \text{(I)}$$

$$5.00 \leq \frac{C6(PHC)}{C6(PHC-1) * \frac{[PHC-1]}{[PHC]}} \leq 8.50; \quad \text{(Ia)}$$

$$5.00 \leq \frac{C6(PHC)}{C6(PHC-1) * \frac{[PHC-1]}{[PHC]}} \leq 8.00; \quad \text{(Ib)}$$

$$5.00 \leq \frac{C6(PHC)}{C6(PHC-1) * \frac{[PHC-1]}{[PHC]}} \leq 7.50; \quad \text{(Ic)}$$

wherein

"C6 (PHC-1)" is the 1-hexene content of the $1^{st}$ propylene 1-hexene copolymer (PHC-1) based on the total weight of the $1^{st}$ propylene 1-hexene copolymer (PHC-1) [in wt.-%];

"C6 (PHC)" is the 1-hexene content of the propylene 1-hexene copolymer (PHC) based on the total weight of the propylene 1-hexene copolymer (PHC) [in wt.-%];

"[PHC-1]/[PHC]" is the weight ratio between the $1^{st}$ propylene 1-hexene copolymer (PHC-1) and the propylene 1-hexene copolymer (PHC) [in g/g].

Additionally or alternatively, it is preferred that the propylene 1-hexene copolymer (PHC) fulfills the inequation (II), still more preferably the inequation (IIa), yet more preferably the inequation (IIb), still yet more preferably the inequation (IIc), $$\frac{C6(PHC-2) * \frac{[PHC-2]}{[PHC]}}{C6(PHC)} \geq 0.65 \quad \text{(II)}$$

$$0.65 \leq \frac{C6(PHC-2) * \frac{[PHC-2]}{[PHC]}}{C6(PHC)} \leq 1.00; \quad \text{(IIa)}$$

$$0.70 \leq \frac{C6(PHC-2) * \frac{[PHC-2]}{[PHC]}}{C6(PHC)} \leq 0.95; \quad \text{(IIb)}$$

$$0.75 \leq \frac{C6(PHC-2) * \frac{[PHC-2]}{[PHC]}}{C6(PHC)} \leq 0.90; \quad \text{(IIc)}$$

wherein

"C6 (PHC-2)" is the 1-hexene content of the $2^{nd}$ propylene 1-hexene copolymer (PHC-2) based on the total weight of the $2^{nd}$ propylene 1-hexene copolymer (PHC-2) [in wt.-%];

"C6 (PHC)" is the 1-hexene content of the propylene 1-hexene copolymer (PHC) based on the total weight of the propylene 1-hexene copolymer (PHC) [in wt.-%];

"[PHC-2]/[PHC]" is the weight ratio between the $2^{nd}$ propylene 1-hexene copolymer (PHC-2) and the propylene 1-hexene copolymer (PHC) [in g/g].

As mentioned above it is preferred that the $2^{nd}$ propylene 1-hexene copolymer (PHC-2) is the 1-hexene rich fraction. Accordingly it is preferred that the $2^{nd}$ propylene 1-hexene copolymer (PHC-2) has an 1-hexene content in the range of 2.5 to 6.0 wt.-%, more preferably in the range of 2.8 to 5.5 wt.-%, yet more preferably in the range of 3.0 to 5.3 wt.-%. Throughout the present invention, the amount of 1-hexene for the $2^{nd}$ propylene 1-hexene copolymer (PHC-2) is calculated based on the total weight of the $2^{nd}$ propylene 1-hexene copolymer (PHC-2).

Further it is appreciated that the $1^{st}$ propylene 1-hexene copolymer (PHC-1) has a melt flow rate $MFR_2$ of at least 0.5 g/10 min, more preferably in the range of 0.5 to 20.0 g/10 min, still more preferably in the range of 0.5 to 10.0 g/10 min, yet more preferably in the range of 0.5 to 5.0 g/10 min, still yet more preferably in the range of 0.8 to 4.0 g/10 min.

Thus in a specific embodiment of the present invention the propylene 1-hexene copolymer (PHC) comprises a $1^{st}$ propylene 1-hexene copolymer (PHC-1) and a $2^{nd}$ propylene 1-hexene copolymer (PHC-2), wherein (a) said propylene 1-hexene copolymer (PHC) has
  (a1) an 1-hexene content in the range of 2.5 to 6.0 wt.-%, based on the total weight of the propylene 1-hexene copolymer (PHC);
  (a2) a xylene soluble fraction (XCS) determined at 25° C. according to ISO 16152 in the range of 0.3 to 15.0 wt.-%, based on the total weight of the xylene soluble fraction (XCS) of the propylene 1-hexene copolymer (PHC); and
  (a3) optionally a melting temperature of at least 130° C., preferably in the range of 133 to 139° C.;
wherein further
(b) said $1^{st}$ propylene 1-hexene copolymer (PHC-1) has an 1-hexene content in the range of 0.7 to 2.5 wt.-% based on the total weight of the $1^{st}$ propylene 1-hexene copolymer (PHC-1);
(c) said $2^{nd}$ propylene 1-hexene copolymer (PHC-2) has preferably an 1-hexene content in the range of 2.8 to 5.5 wt.-% based on the total weight of the $2^{nd}$ propylene 1-hexene copolymer (PHC-2);
wherein further
(d) the amount of the $1^{st}$ propylene 1-hexene copolymer (PHC-1) and of the $2^{nd}$ propylene 1-hexene copolymer (PHC-2) together is at least 95 wt.-%, based on the total weight of the propylene 1-hexene copolymer (PHC), preferably the propylene 1-hexene copolymer (PHC) consists of the $1^{st}$ propylene 1-hexene copolymer (PHC-1) and of the $2^{nd}$ propylene 1-hexene copolymer (PHC-2); and
(e) wherein the weight ratio [(PHC-1)/(PHC-2)] between the $1^{st}$ propylene 1-hexene copolymer (PHC-1) and the $2^{nd}$ propylene 1-hexene copolymer (PHC-2) is in the range of 30/70 to 50/50.

In another specific embodiment of the present invention the propylene 1-hexene copolymer (PHC) comprises a $1^{st}$ propylene 1-hexene copolymer (PHC-1) and a $2^{nd}$ propylene 1-hexene copolymer (PHC-2), wherein (b) said propylene 1-hexene copolymer (PHC) has
  (a1) an 1-hexene content in the range of 2.5 to 4.0 wt.-% based on the total weight of the propylene 1-hexene copolymer (PHC);
  (a2) a xylene soluble fraction (XCS) determined at 25° C. according to ISO 16152 in the range of 0.3 to 9.5 wt.-%, based on the total weight of the xylene soluble fraction (XCS) of the propylene 1-hexene copolymer (PHC); and
  (a3) optionally a melting temperature of at least 130° C., preferably in the range of 133 to 142° C., like in the range of 133 to 139° C.;
wherein further
(b) said $1^{st}$ propylene 1-hexene copolymer (PHC-1) has an 1-hexene content in the range of 0.6 to 3.0 wt.-% based on the total weight of the $1^{st}$ propylene 1-hexene copolymer (PHC-1);
(c) said $2^{nd}$ propylene 1-hexene copolymer (PHC-2) has preferably an 1-hexene content in the range of 2.8 to 5.5 wt.-% based on the total weight of the $2^{nd}$ propylene 1-hexene copolymer (PHC-2);
wherein further
(d) the amount of the $1^{st}$ propylene 1-hexene copolymer (PHC-1) and of the $2^{nd}$ propylene 1-hexene copolymer (PHC-2) together is at least 95 wt.-%, based on the total weight of the propylene 1-hexene copolymer (PHC), preferably the propylene 1-hexene copolymer (PHC)

consists of the 1$^{st}$ propylene 1-hexene copolymer (PHC-1) and of the 2$^{nd}$ propylene 1-hexene copolymer (PHC-2);
(e) wherein the weight ratio [(PHC-1)/(PHC-2)] between the 1$^{st}$ propylene 1-hexene copolymer (PHC-1) and the 2$^{nd}$ propylene 1-hexene copolymer (PHC-2) is in the range of 30/70 to 50/50; and
(f) the xylene soluble fraction (XCS) of the propylene 1-hexene copolymer (PHC) has an 1-hexene content in the range of 2.8 to 6.0 wt.-%, based on the total weight of the xylene soluble fraction (XCS) of the propylene 1-hexene copolymer (PHC).

In a more specific embodiment of the present invention the propylene 1-hexene copolymer (PHC) comprises a 1$^{st}$ propylene 1-hexene copolymer (PHC-1) and a 2$^{nd}$ propylene 1-hexene copolymer (PHC-2), wherein
(c) said propylene 1-hexene copolymer (PHC) has
(a1) an 1-hexene content in the range of 2.5 to 4.0 wt.-% based on the total weight of the propylene 1-hexene copolymer (PHC);
(a2) a xylene soluble fraction (XCS) determined at 25° C. according to ISO 16152 in the range of 0.3 to 9.5 wt.-%, based on the total weight of the xylene soluble fraction (XCS) of the propylene 1-hexene copolymer (PHC); and
(a3) optionally a melting temperature of at least 130° C., preferably in the range of 133 to 142° C., like in the range of 133 to 139° C.;
wherein further
(b) said 1$^{st}$ propylene 1-hexene copolymer (PHC-1) has an 1-hexene content in the range of 0.6 to 3.0 wt.-% based on the total weight of the 1$^{st}$ propylene 1-hexene copolymer (PHC-1);
(c) said 2$^{nd}$ propylene 1-hexene copolymer (PHC-2) has preferably an 1-hexene content in the range of 2.8 to 5.5 wt.-% based on the total weight of the 2$^{nd}$ propylene 1-hexene copolymer (PHC-2);
wherein still further
(d) the amount of the 1$^{st}$ propylene 1-hexene copolymer (PHC-1) and of the 2$^{nd}$ propylene 1-hexene copolymer (PHC-2) together is at least 95 wt.-%, based on the total weight of the propylene 1-hexene copolymer (PHC), preferably the propylene 1-hexene copolymer (PHC) consists of the 1$^{st}$ propylene 1-hexene copolymer (PHC-1) and of the 2$^{nd}$ propylene 1-hexene copolymer (PHC-2);
(e) the weight ratio [(PHC-1)/(PHC-2)] between the 1$^{st}$ propylene 1-hexene copolymer (PHC-1) and the 2$^{nd}$ propylene 1-hexene copolymer (PHC-2) is in the range of 30/70 to 50/50; and
(f) optionally the xylene soluble fraction (XCS) of the propylene 1-hexene copolymer (PHC) has an 1-hexene content in the range of 2.5 to 7.0 wt.-%, based on the total weight of the xylene soluble fraction (XCS) of the propylene 1-hexene copolymer (PHC);
wherein still yet further the propylene 1-hexene copolymer (PHC) fulfills
(g) the inequation (Ib), preferably the inequation (Ic), $$5.00 \leq \frac{C6(PHC)}{C6(PHC-1) * \frac{[PHC-1]}{[PHC]}} \leq 8.00; \quad (Ib)$$

$$5.00 \leq \frac{C6(PHC)}{C6(PHC-1) * \frac{[PHC-1]}{[PHC]}} \leq 7.50; \quad (Ic)$$

wherein
"C6 (PHC-1)" is the 1-hexene content of the 1$^{st}$ propylene 1-hexene copolymer (PHC-1) based on the total weight of the 1$^{st}$ propylene 1-hexene copolymer (PHC-1) [in wt.-%];
"C6 (PHC)" is the 1-hexene content of the propylene 1-hexene copolymer (PHC) based on the total weight of the propylene 1-hexene copolymer (PHC) [in wt.-%];
"[PHC-1]/[PHC]" is the weight ratio between the 1$^{st}$ propylene 1-hexene copolymer (PHC-1) and the propylene 1-hexene copolymer (PHC) [in g/g];
and
(h) optionally fulfills the inequation (IIb), preferably the inequation (IIc), $$0.70 \leq \frac{C6(PHC-2) * \frac{[PHC-2]}{[PHC]}}{C6(PHC)} \leq 0.95; \quad (IIb)$$

$$0.75 \leq \frac{C6(PHC-2) * \frac{[PHC-2]}{[PHC]}}{C6(PHC)} \leq 0.90; \quad (IIc)$$

wherein
"C6 (PHC-2)" is the 1-hexene content of the 2$^{nd}$ propylene 1-hexene copolymer (PHC-2) based on the total weight of the 2$^{nd}$ propylene 1-hexene copolymer (PHC-2) [in wt.-%];
"C6 (PHC)" is the 1-hexene content of the propylene 1-hexene copolymer (PHC) based on the total weight of the propylene 1-hexene copolymer (PHC) [in wt.-%];
"[PHC-2]/[PHC]" is the weight ratio between the 2$^{nd}$ propylene 1-hexene copolymer (PHC-2) and the propylene 1-hexene copolymer (PHC) [in g/g].

In a more specific embodiment of the present invention the propylene 1-hexene copolymer (PHC) comprises a 1$^{st}$ propylene 1-hexene copolymer (PHC-1) and a 2$^{nd}$ propylene 1-hexene copolymer (PHC-2), wherein
(a) said propylene 1-hexene copolymer (PHC) has
(a1) an 1-hexene content in the range of 2.5 to 4.0 wt.-% based on the total weight of the propylene 1-hexene copolymer (PHC);
(a2) a xylene soluble fraction (XCS) determined at 25° C. according to ISO 16152 in the range of 0.3 to 9.5 wt.-%, based on the total weight of the xylene soluble fraction (XCS) of the propylene 1-hexene copolymer (PHC);
(a3) a molecular weight distribution (Mw/Mn) of not more than 4.5; preferably in the range of 3.0 to 4.3;
(a4) optionally 2,1 erythro regio defects of at least 0.42% determined by $^{13}$C NMR spectroscopy; and
(a5) optionally a melting temperature of at least 130° C., preferably in the range of 133 to 142° C., like in the range of 133 to 139° C.;
wherein further
(b) said 1$^{st}$ propylene 1-hexene copolymer (PHC-1) has an 1-hexene content in the range of 0.6 to 3.0 wt.-% based on the total weight of the 1$^{st}$ propylene 1-hexene copolymer (PHC-1);

(c) said 2$^{nd}$ propylene 1-hexene copolymer (PHC-2) has preferably an 1-hexene content in the range of 2.8 to 5.5 wt.-% based on the total weight of the 2$^{nd}$ propylene 1-hexene copolymer (PHC-2);

wherein still further (d) the amount of the 1$^{st}$ propylene 1-hexene copolymer (PHC-1) and of the 2$^{nd}$ propylene 1-hexene copolymer (PHC-2) together is at least 95 wt.-%, based on the total weight of the propylene 1-hexene copolymer (PHC), preferably the propylene 1-hexene copolymer (PHC) consists of the 1$^{st}$ propylene 1-hexene copolymer (PHC-1) and of the 2$^{nd}$ propylene 1-hexene copolymer (PHC-2);

(e) the weight ratio [(PHC-1)/(PHC-2)] between the 1$^{st}$ propylene 1-hexene copolymer (PHC-1) and the 2$^{nd}$ propylene 1-hexene copolymer (PHC-2) is in the range of 30/70 to 50/50; and (f) optionally the xylene soluble fraction (XCS) of the propylene 1-hexene copolymer (PHC) has an 1-hexene content in the range of 2.5 to 7.0 wt.-%, based on the total weight of the xylene soluble fraction (XCS) of the propylene 1-hexene copolymer (PHC);

wherein still yet further the propylene 1-hexene copolymer (PHC) fulfills (g) the inequation (Ib), preferably the inequation (Ic), $$5.00 \leq \frac{C6(PHC)}{C6(PHC-1) * \frac{[PHC-1]}{[PHC]}} \leq 8.00; \quad \text{(Ib)}$$

$$5.00 \leq \frac{C6(PHC)}{C6(PHC-1) * \frac{[PHC-1]}{[PHC]}} \leq 7.50; \quad \text{(Ic)}$$

wherein

"C6 (PHC-1)" is the 1-hexene content of the 1$^{st}$ propylene 1-hexene copolymer (PHC-1) based on the total weight of the 1$^{st}$ propylene 1-hexene copolymer (PHC-1) [in wt.-%];

"C6 (PHC)" is the 1-hexene content of the propylene 1-hexene copolymer (PHC) based on the total weight of the propylene 1-hexene copolymer (PHC) [in wt.-%];

"[PHC-1]/[PHC]" is the weight ratio between the 1$^{st}$ propylene 1-hexene copolymer (PHC-1) and the propylene 1-hexene copolymer (PHC) [in g/g];

and (h) optionally fulfills the inequation (IIb), preferably the inequation (IIc), $$0.70 \leq \frac{C6(PHC-2) * \frac{[PHC-2]}{[PHC]}}{C6(PHC)} - \leq 0.95; \quad \text{(IIb)}$$

$$0.75 \leq \frac{C6(PHC-2) * \frac{[PHC-2]}{[PHC]}}{C6(PHC)} \leq 0.90; \quad \text{(IIc)}$$

wherein

"C6 (PHC-2)" is the 1-hexene content of the 2$^{nd}$ propylene 1-hexene copolymer (PHC-2) based on the total weight of the 2$^{nd}$ propylene 1-hexene copolymer (PHC-2) [in wt.-%];

"C6 (PHC)" is the 1-hexene content of the propylene 1-hexene copolymer (PHC) based on the total weight of the propylene 1-hexene copolymer (PHC) [in wt.-%];

"[PHC-2]/[PHC]" is the weight ratio between the 2$^{nd}$ propylene 1-hexene copolymer (PHC-2) and the propylene 1-hexene copolymer (PHC) [in g/g].

The propylene 1-hexene copolymer (PHC) is in particular obtainable, preferably obtained, by a process as defined in detail below.

It is preferred that the propylene 1-hexene copolymer (PHC) is obtained in the presence of a metallocene catalyst, especially in the presence of a metallocene catalyst as defined in detail below.

Still more preferably the propylene 1-hexene copolymer (PHC) is obtained by a sequential polymerization process, especially by a sequential polymerization process as defined below, thereby using a metallocene catalyst, especially a metallocene catalyst as defined in detail below.

In case the propylene 1-hexene copolymer (PHC) comprises the propylene 1-hexene copolymers (PHC-A) and (PHC-B) said propylene 1-hexene copolymer (PHC) is obtained by blending the at least two propylene 1-hexene copolymers (PHC-1) and (PHC-1) or by sequential polymerization of the at least two propylene 1-hexene copolymers (PHC-1) and (PHC-1) as described in detail below.

It is especially preferred that the propylene 1-hexene copolymer (PHC) and thus the at least two propylene 1-hexene copolymers (PHC-1) and (PHC-1) are produced in the presence of a metallocene catalyst, especially in the presence of a metallocene catalyst with a metallocene complex (procatalyst) as defined in WO 2015/011135 A1. Accordingly preferred metallocene complexes (procatalysts) are rac-dimethylsilanediylbis [2-methyl-4-(4-tert-butylphenyl)-1,5,6,7-tetrahydro-s-indacen-1-yl] zirconium dichloride;

rac-dimethylsilanediylbis(2-methyl-4-phenyl-5-methoxy-6-tert-butylinden-1-yl) zirconium dichloride;

rac-anti-Me$_2$Si(2-Me-4-Ph-6-tBu-Ind)(2-Me-4-Ph-5-OMe-6-tBu-Ind)ZrCl$_2$;

rac-anti-Me$_2$Si(2-Me-4-(p-tBuPh)-Ind)(2-Me-4-Ph-5-OMe-6-tBu-Ind)ZrCl$_2$;

rac-anti-Me$_2$Si(2-Me-4-(3,5-di-tBuPh)-6-tBu-Ind)(2-Me-4-Ph-5-OMe-6-tBu-Ind)ZrCl$_2$;

rac-anti-Me$_2$Si(2-Me-4-(p-tBuPh)-Ind)(2-Me-4-Ph-5-OC$_6$F$_5$)-6-iPr-Ind)ZrCl$_2$;

rac-anti-Me(CyHex)Si(2-Me-4-Ph-6-tBu-Ind)(2-Me-4-Ph-5-OMe-6-tBu-Ind)ZrCl$_2$;

rac-anti-Me$_2$Si(2-Me-4-(3,5-di-tBuPh)-7-Me-Ind)(2-Me-4-Ph-5-OMe-6-tBu-Ind)ZrCl$_2$;

rac-anti-Me$_2$Si(2-Me-4-(3,5-di-tBuPh)-7-OMe-Ind)(2-Me-4-Ph-5-OMe-6-tBu-Ind)ZrCl$_2$;

rac-anti-Me$_2$Si(2-Me-4-(p-tBuPh)-6-tBu-Ind)(2-Me-4-Ph-5-OMe-6-tBu-Ind)ZrCl$_2$;

rac-anti-Me$_2$Si(2-Me-4-(p-tBuPh)-Ind)(2-Me-4-(4-tBuPh)-5-OMe-6-tBu-Ind)ZrCl$_2$;

rac-anti-Me$_2$Si(2-Mc-4-(p-tBuPh)-Ind)(2-Me-4-(3,5-iBu2Ph)-5-OMe-6-Bu-Ind)ZrCl$_2$;

rac-anti-Mc$_2$Si(2-Mc-4-(p-tBuPh)-Ind)(2-Mc-4-Ph-5-OiBu-6-tBu-Ind)ZrCl$_2$.

The most preferred metallocene complex (procatalyst) is rac-anti-dimethylsilandiyl(2-methyl-4-phenyl-5-methoxy-6-tert-butyl-indenyl)(2-methyl-4-(4-tert-butylphenyl)indenyl)zirconium dichloride.

Beside the metallocene complex (procatalyst), the metallocene catalyst comprises additionally a cocatalyst as defined in WO 2015/011135 A1. Accordingly the preferred cocatalyst is methylaluminoxane (MAO).

It is especially preferred that the metallocene catalyst is unsupported, i.e. no external carrier is used. Regarding the preparation of such a metallocene complex again reference is made to WO 2015/011135 A1.

It is in particular preferred that a catalyst is used as described in the example section.

In case the sequential polymerization is applied, the following polymerization conditions are preferred. The term "sequential polymerization process" indicates that the propylene 1-hexene copolymer (PHC) is produced in at least two reactors connected in series. More precisely the "term sequential polymerization process" indicates in the present application that the polymer of the first reactor (R-1) is directly conveyed with unreacted comonomers to the second reactor (R-2). Accordingly decisive aspect of the present process is the preparation of the propylene 1-hexene copolymer (PHC) in two different reactors, wherein the reaction material of the first reactor (R-1) is directly conveyed to the second reactor (R-2). Thus the present process comprises at least a first reactor (R-1) and a second reactor (R-2). In one specific embodiment the instant process consists of two the polymerization reactors (R-1) and (R-2). The term "polymerization reactor" shall indicate that the main polymerization takes place. Thus in case the process consists of two polymerization reactors, this definition does not exclude the option that the overall process comprises for instance a pre-polymerization step in a pre-polymerization reactor. The term "consists of" is only a closing formulation in view of the main polymerization reactors.

Preferably, in the first reactor (R-1) the $1^{st}$ propylene 1-hexene copolymer (PHC-1) and in the second reactor (R-2) the $2^{nd}$ propylene 1-hexene copolymer (PHC-2) is produced.

The first reactor (R-1) is preferably a slurry reactor (SR) and can be can be any continuous or simple stirred batch tank reactor or loop reactor operating in bulk or slurry. Bulk means a polymerization in a reaction medium that comprises of at least 60% (wt/wt), preferably 100% monomer. According to the present invention the slurry reactor (SR) is preferably a (bulk) loop reactor (LR).

The second reactor (R-2) and any subsequent reactor are preferably gas phase reactors (GPR). Such gas phase reactors (GPR) can be any mechanically mixed or fluid bed reactors. Preferably the gas phase reactor s (GPR) comprise a mechanically agitated fluid bed reactor with gas velocities of at least 0.2 m/sec. Thus it is appreciated that the gas phase reactor is a fluidized bed type reactor preferably with a mechanical stirrer.

The condition (temperature, pressure, reaction time, monomer feed) in each reactor is dependent on the desired product which is in the knowledge of a person skilled in the art. As already indicated above, the first reactor (R-1) is preferably a slurry reactor (SR), like a loop reactor (LR), whereas the second reactor (R-2) is preferably a gas phase reactor (GPR-1). The subsequent reactors—if present—are also preferably gas phase reactors (GPR).

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379, and WO 98/58976. The contents of these documents are included herein by reference.

Preferably, in the instant process for producing the propylene 1-hexene copolymer (PHC) as defined above the conditions for the first reactor (R-1), i.e. the slurry reactor (SR), like a loop reactor (LR), where preferably the $1^{st}$ propylene 1-hexene copolymer (PHC-A) is produced if present, may be as follows:

the temperature is within the range of 40° C. to 110° C., preferably between 60° C. and 100° C., 70 to 90° C.;
the pressure is within the range of 20 bar to 80 bar, preferably between 40 bar to 70 bar;
hydrogen can be added for controlling the molar mass in a manner known per se;
the 1-hexene/propylene ratio is preferably in the range of 4.0 to 12.0 mol/kmol, more preferably in the range of 5.0 to 10.0 mol/kmol.

Subsequently, the reaction mixture of the first reactor (R-1) is transferred to the second reactor (R-2), i.e. gas phase reactor (GPR-1), where preferably the $2^{nd}$ propylene 1-hexene copolymer (PHC-B) is produced if present. The conditions in the second reactor (R-2) are preferably as follows:

the temperature is within the range of 50° C. to 130° C., preferably between 60° C. and 100° C.,
the pressure is within the range of 5 bar to 50 bar, preferably between 15 bar to 40 bar,
hydrogen can be added for controlling the molar mass in a manner known per se.
the 1-hexene/propylene ratio is preferably in the range of 5.0 to 16.0 mol/kmol, more preferably in the range of 6.0 to 12.0 mol/kmol.

The residence time can vary in both reactor zones.

In one embodiment of the process for producing propylene copolymer composition (P) the residence time in bulk reactor, e.g. loop is in the range 0.2 to 4 hours, e.g. 0.3 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R-1), i.e. in the slurry reactor (SR), like in the loop reactor (LR), and/or as a condensed mode in the gas phase reactor (GPR-1).

The conditions in the other gas phase reactors (GPR), if present, are similar to the second reactor (R-2).

The present process may also encompass a pre-polymerization prior to the polymerization in the first reactor (R-1). The pre-polymerization can be conducted in the first reactor (R-1), however it is preferred that the pre-polymerization takes place in a separate reactor, so called pre-polymerization reactor.

The Plastomer (PL)

As stated above, the $2^{nd}$ base polymer composition (BC2) may comprise as a further polymer a plastomer (PL). The plastomer (PL) according to this invention is a copolymer of ethylene and at least one $C_4$ to $C_{10}$ α-olefin, preferably a copolymer of ethylene and 1-hexene or a copolymer of ethylene and 1-octene, the latter especially preferred.

Preferably, the plastomer (PL) is a very low density polyolefin, more preferably a very low density polyolefin polymerized using single site, preferably metallocene catalysis.

In a preferred embodiment, the plastomer (PL) has a density in the range of 0.860 to 0.930 g/cm³, preferably in the range of 0.870 to 0.925 g/cm³, more preferably in the range of 0.875 to 0.920 g/cm³.

Preferably, the plastomer (PL) has a melt flow rate $MFR_2$ (190° C., 2.16 kg) in the range of 0.1 to 40.0 g/10 min, more preferably in the range of 0.3 to 25.0 g/10 min, still more preferably in the range of 0.4 to 15.0 g/10 min, like in the range of 0.4 to 8.0 g/10.0 min.

Preferably, the plastomer (PL) comprises units derived from ethylene and a $C_4$ to $C_8$ α-olefin.

The plastomer (PL) comprises, preferably consists of, units derivable from (i) ethylene and (ii) at least another $C_4$ to $C_8$ α-olefin, more preferably units derivable from (i) ethylene and (ii) at least another Q-olefin selected form the group consisting of 1-butene, 1-pentene, 1-hexene, 1-heptene and 1-octene. It is especially preferred that the plastomer (PL) comprises at least units derivable from (i) ethylene and (ii) 1-hexene or 1-octene.

In an especially preferred embodiment, the plastomer (PL) consists of units derivable from (i) ethylene and (ii) 1-hexene or 1-octene. In particular, it is preferred that the plastomer (PL) is a copolymer of ethylene and 1-octene.

The ethylene content of the plastomer (PL) is in the range of 60.0 to 95.0 wt.-%, preferably in the range of 65.0 to 90.0 wt.-%, more preferably in the range of 70.0 to 85.0 wt.-%.

Additionally it is preferred that the plastomer (PL) has a melting temperature of below 100° C., more preferably in the range of 50° C. to 90° C., still more preferably in the range of 60° C. to 85° C.

Alternatively or additionally to the previous paragraph the plastomer (PL) has a glass transition temperature of below −25° C., more preferably in the range of −65° C. to −30° C., still more preferably in the range of −60° C. to −35° C.

Accordingly it is especially preferred that the plastomer (PL) is a copolymer of ethylene and 1-hexene or a copolymer of ethylene and 1-octene, the latter preferred,
wherein further
the plastomer (P) has
(a) a glass transition temperature in the range of −60° C. to −35° C., preferably in the range of −60 to −40° C., more preferably in the range of −60 to −50° C., and
(b) optionally a density in the range of 0.870 to 0.925 g/cm³, more preferably in the range of 0.875 to 0.920 g/cm³.

Still more preferably the plastomer (PL) is a copolymer of ethylene and 1-hexene or a copolymer of ethylene and 1-octene, the latter preferred,
wherein further
the plastomer (P) has
(a) a glass transition temperature in the range of −60 to −40° C., more preferably in the range of −60 to −50° C., and
(b) a density in the range of 0.870 to 0.925 g/cm³, more preferably in the range of 0.875 to 0.920 g/cm³,
(c) optionally an ethylene content in the range of 65.0 to 90.0 wt.-%, preferably in the range of 70.0 to 85.0 wt.-%.

Yet more preferably the plastomer (PL) is a copolymer of ethylene and 1-hexene or a copolymer of ethylene and 1-octene, the latter preferred,
wherein further
the plastomer (P) has
(a) a glass transition temperature in the range of −60 to −40° C., more preferably in the range of −60 to −50° C., and
(b) a density in the range of 0.870 to 0.925 g/cm³, more preferably in the range of 0.875 to 0.920 g/cm³,
(c) an ethylene content in the range of 65.0 to 90.0 wt.-%, preferably in the range of 70.0 to 85.0 wt.-%, and
(d) optionally a melting temperature in the range of 60° C. to 85° C.

In one preferred embodiment the plastomer (PL) is prepared with at least one metallocene catalyst. The plastomer (PL) may also be prepared with more than one metallocene catalyst or may be a blend of multiple elastomers prepared with different metallocene catalysts. In some embodiments, the plastomer (PL) is a substantially linear ethylene polymer (SLEP). SLEPs and other metallocene catalyzed plastomer (PL) are known in the art, for example, U.S. Pat. No. 5,272,236. These resins are also commercially available, for example, as Queo™ plastomers available from Borealis, ENGAGE™ plastomer resins available from Dow Chemical Co., EXACT™ polymers from Exxon or TAFMER™ polymers from Mitsui, Lucene polymers from LG, Fortify polymers from Sabic or Solumer polymers from SK Chemicals. Terpolymers such as Antco™ from Borouge are also suitable.

Thus in case the $2^{nd}$ base polymer composition (BC2) comprises the plastomer (PL) the following embodiments are preferred.

Base polymer composition (BPC), i.e. the $2^{nd}$ base polymer composition (BC2), comprising, preferably consisting of,
(a) 75 to 95 wt.-%, based on the total weight of the base polymer composition (BPC), of a propylene 1-hexene copolymer (PHC) comprising a $1^{st}$ propylene 1-hexene copolymer (PHC-1) and a $2^{nd}$ propylene 1-hexene copolymer (PHC-2),
and
(b) 5 to 25 wt.-%, based on the total weight of the $2^{nd}$ base polymer composition (BC2), of a plastomer (PL) having a density in the range of 0.870 to 0.925 g/cm³ and optionally a glass transition temperature in the range of −60 to −40° C., more preferably in the range of −60 to −50° C., said plastomer being an elastomeric copolymer of ethylene and at least one $C_4$ to $C_{10}$ α-olefin;
wherein
(a1) said propylene 1-hexene copolymer (PHC) has an 1-hexene content in the range of 2.8 to 6.0 wt.-%, based on the total weight of the propylene 1-hexene copolymer (PHC);
(a2) said propylene 1-hexene copolymer (PHC) has a xylene soluble fraction (XCS) determined at 25° C. according to ISO 16152 in the range of 0.3 to 9.5 wt.-%, based on the total weight of the xylene soluble fraction (XCS) of the propylene 1-hexene copolymer (PHC);
(a3) said $1^{st}$ propylene 1-hexene copolymer (PHC-1) has an 1-hexene content in the range of 0.6 to 3.0 wt.-% based on the total weight of the $1^{st}$ propylene 1-hexene copolymer (PHC-1);
(a4) said 2nd propylene 1-hexene copolymer (PHC-2) has preferably an 1-hexene content in the range of 2.8 to 5.5 wt.-% based on the total weight of the $2^{nd}$ propylene 1-hexene copolymer (PHC-2);
(a5) the total amount of the $1^{st}$ propylene 1-hexene copolymer (PHC-1) and the $2^{nd}$ propylene 1-hexene copolymer (PHC-2) together based on the total weight of the propylene 1-hexene copolymer (PHC) is at least 95 wt.-%, preferably the propylene 1-hexene copolymer (PHC) consists of the $1^{st}$ propylene 1-hexene copolymer (PHC-1) and the $2^{nd}$ propylene 1-hexene copolymer (PHC-2);
(a6) the weight ratio [(PHC-1)/(PHC-2)] between the 1 propylene 1-hexene copolymer (PHC-1) and the $2^{nd}$ propylene 1-hexene copolymer (PHC-2) is in the range of 30/70 to 50/50.

In a preferred embodiment the base polymer composition (BPC), i.e. the $2^{nd}$ base polymer composition (BC2), comprises, preferably consists of,
(a) 80 to 95 wt.-%, based on the total weight of the base polymer composition (BPC), of a propylene 1-hexene copolymer (PHC) comprising a $1^{st}$ propylene 1-hexene copolymer (PHC-1) and a $2^{nd}$ propylene 1-hexene copolymer (PHC-2), and
(b) 5 to 20 wt.-%, based on the total weight of the $2^{nd}$ base polymer composition (BC2), of a plastomer (PL) having a density in the range of 0.870 to 0.925 g/cm³, said plastomer being an elastomeric copolymer of ethylene and at least one $C_4$ to $C_{10}$ α-olefin;
wherein
(a1) said propylene 1-hexene copolymer (PHC) has an 1-hexene content in the range of 2.5 to 4.0 wt.-%, based on the total weight of the propylene 1-hexene copolymer (PHC);
(a2) said propylene 1-hexene copolymer (PHC) has a xylene soluble fraction (XCS) determined at 25° C. according to ISO 16152 in the range of 0.3 to 9.5 wt.-%, based on the total weight of the xylene soluble fraction (XCS) of the propylene 1-hexene copolymer (PHC);
(a3) optionally a melting temperature of at least 130° C., preferably in the range of 133 to 142° C., like in the range of 133 to 139° C.;
(a4) said $1^{st}$ propylene 1-hexene copolymer (PHC-1) has an 1-hexene content in the range of 0.6 to 3.0 wt.-% based on the total weight of the $1^{st}$ propylene 1-hexene copolymer (PHC-1);
(a5) said $2^{nd}$ propylene 1-hexene copolymer (PHC-2) has preferably an 1-hexene content in the range of 2.8 to 5.5 wt.-% based on the total weight of the $2^{nd}$ propylene 1-hexene copolymer (PHC-2);
(a6) the total amount of the $1^{st}$ propylene 1-hexene copolymer (PHC-1) and the $2^{nd}$ propylene 1-hexene copolymer (PHC-2) together based on the total weight of the propylene 1-hexene copolymer (PHC) is at least 95 wt.-%, preferably the propylene 1-hexene copolymer (PHC) consists of the the $1^{st}$ propylene 1-hexene copolymer (PHC-1) and the $2^{nd}$ propylene 1-hexene copolymer (PHC-2);
(a7) the weight ratio [(PHC-1)/(PHC-2)] between the $1^{st}$ propylene 1-hexene copolymer (PHC-1) and the $2^{nd}$ propylene 1-hexene copolymer (PHC-2) is in the range of 30/70 to 50/50,
and wherein further
(b1) the plastomer (PL) consists of units derivable from (i) ethylene and (ii) 1-hexene and/or 1-octene;
(b2) optionally the ethylene content of the plastomer (PL) is in the range of 65.0 to 90.0 wt.-%;
(b3) the plastomer (PL) has a glass transition temperature in the range of −65 to −30° C., preferably a glass transition temperature in the range of −60 to −40° C., more preferably in the range of −60 to −50° C.; and
(b4) optionally the plastomer (PL) has a melting in the range of 50 to 90° C.

In a still further preferred embodiment the base polymer composition (BPC), i.e. the $2^{nd}$ base polymer composition (BC2), comprises, preferably consists of,
(a) 80 to 95 wt.-%, based on the total weight of the base polymer composition (BPC), of a propylene 1-hexene copolymer (PHC) comprising a $1^{st}$ propylene 1-hexene copolymer (PHC-1) and a $2^{nd}$ propylene 1-hexene copolymer (PHC-2), and
(b) 5 to 20 wt.-%, based on the total weight of the $2^{nd}$ base polymer composition (BC2), of a plastomer (PL) having a density in the range of 0.875 to 0.920 g/cm³, said plastomer being an elastomeric copolymer of ethylene and at least one $C_4$ to $C_{10}$ α-olefin;

wherein
(a1) said propylene 1-hexene copolymer (PHC) has an 1-hexene content in the range of 2.5 to 4.0 wt.-%, based on the total weight of the propylene 1-hexene copolymer (PHC);
(a2) said propylene 1-hexene copolymer (PHC) has a xylene soluble fraction (XCS) determined at 25° C. according to ISO 16152 in the range of 0.3 to 9.5 wt.-%, based on the total weight of the xylene soluble fraction (XCS) of the propylene 1-hexene copolymer (PHC), preferably said xylene soluble fraction (XCS) of the propylene 1-hexene copolymer (PHC) has an 1-hexene content in the range of 2.5 to 7.0 wt.-%, based on the total weight of the xylene soluble fraction (XCS) of the propylene 1-hexene copolymer (PHC);
(a3) said propylene 1-hexene copolymer (PHC) has a molecular weight distribution (Mw/Mn) of not more than 4.5; preferably in the range of 3.0 to 4.3;
(a4) optionally said propylene 1-hexene copolymer (PHC) has 2,1 erythro regio defects of at least 0.42% determined by $^{13}C$ NMR spectroscopy;
(a5) optionally a melting temperature of at least 130° C., preferably in the range of 133 to 142° C., like in the range of 133 to 139° C.;
(a6) said $1^{st}$ propylene 1-hexane copolymer (PHC-1) has an 1-hexane content in the range of 0.6 to 3.0 wt.-% based on the total weight of the $1^{st}$ propylene 1-hexene copolymer (PHC-1);
(a7) said $2^{nd}$ propylene 1-hexene copolymer (PHC-2) has preferably an 1-hexene content in the range of 3.0 to 5.3 wt.-% based on the total weight of the $2^{nd}$ propylene 1-hexene copolymer (PHC-2);
(a8) said propylene 1-hexene copolymer (PHC) complies with the inequation (Ib), preferably the inequation (Ic), $$5.00 \leq \frac{C6(PHC)}{C6(PHC-1) * \frac{[PHC-1]}{[PHC]}} \leq 8.00; \quad (Ib)$$

$$5.00 \leq \frac{C6(PHC)}{C6(PHC-1) * \frac{[PHC-1]}{[PHC]}} \leq 7.50; \quad (Ic)$$

wherein
"C6 (PHC-1)" is the 1-hexene content of the $1^{st}$ propylene 1-hexene copolymer (PHC-1) based on the total weight of the $1^{st}$ propylene 1-hexene copolymer (PHC-1) [in wt.-%];
"C6 (PHC)" is the 1-hexene content of the propylene 1-hexene copolymer (PHC) based on the total weight of the propylene 1-hexene copolymer (PHC) [in wt.-%];
"[PHC-1]/[PHC]" is the weight ratio between the $1^{st}$ propylene 1-hexene copolymer (PHC-1) and the propylene 1-hexene copolymer (PHC) [in g/g];
(a9) said propylene 1-hexene copolymer (PHC) complies with the inequation (IIb), preferably the inequation (IIc), $$0.70 \leq \frac{C6(PHC-2) * \frac{[PHC-2]}{[PHC]}}{C6(PHC)} \leq 0.95; \quad (IIb)$$

-continued $$0.75 \leq \frac{C6(PHC-2) * \frac{[PHC-2]}{[PHC]}}{C6(PHC)} \leq 0.90; \quad \text{(IIc)}$$

wherein
"C6 (PHC-2)" is the 1-hexene content of the 2$^{nd}$ propylene 1-hexene copolymer (PHC-2) based on the total weight of the 2$^{nd}$ propylene 1-hexene copolymer (PHC-2) [in wt.-%];
"C6 (PHC)" is the 1-hexene content of the propylene 1-hexene copolymer (PHC) based on the total weight of the propylene 1-hexene copolymer (PHC) [in wt.-%];
"[PHC-2]/[PHC]" is the weight ratio between the 2$^{nd}$ propylene 1-hexene copolymer (PHC-2) and the propylene 1-hexene copolymer (PHC) [in g/g].

(a10) the total amount of the st propylene 1-hexene copolymer (PHC-1) and the 2$^{nd}$ propylene 1-hexene copolymer (PHC-2) together based on the total weight of the propylene 1-hexene copolymer (PHC) is at least 95 wt.-%, preferably the propylene 1-hexene copolymer (PHC) consists of the the st propylene 1-hexene copolymer (PHC-1) and the 2$^{nd}$ propylene 1-hexene copolymer (PHC-2);

(a11) the weight ratio [(PHC-1)/(PHC-2)] between the 1$^{st}$ propylene 1-hexene copolymer (PHC-1) and the 2$^{nd}$ propylene 1-hexene copolymer (PHC-2) is in the range of 30/70 to 50/50, and wherein further
(b1) the plastomer (PL) consists of units derivable from (i) ethylene and (ii) 1-hexene and/or 1-octene;
(b2) optionally the ethylene content of the plastomer (PL) is in the range of 65.0 to 90.0 wt.-%;
(b3) the plastomer (PL) has a glass transition temperature in the range of −65 to −30° C., preferably a glass transition temperature in the range of −60 to −40° C., more preferably in the range of −60 to −50° C.; and
(b4) optionally has a melting in the range of 50 to 90° C.

1$^{st}$ Base Polymer Composition (BC1)

As mentioned above the term "1$^{st}$ base polymer composition (BC1)" indicates that said composition contains just polymers, preferably just polyolefins, still more preferably just polyethylenes. One of the polymers must be the 1$^{st}$ linear low density polyethylene (LLDPE1) as defined in more detail below. Accordingly, it is preferred that 1$^{st}$ base polymer composition (BC1) comprises at least 70 wt.-%, more preferably at least 75 wt.-%, still more preferably at least 80 wt.-%, based on the total weight of the 1$^{st}$ base polymer composition (BC1), of the 1$^{st}$ linear low density polyethylene (LLDPE1) and the remaining part up to 100 wt.-%, based on the total weight of the 1$^{st}$ base polymer composition (BC1), are polymers, preferably polyolefins, more preferably polyethylenes, like the Is' low density polyethylene (LDPE1) as defined in detail below.

Accordingly, in one preferred embodiment the 1$^{st}$ base polymer composition (BC1) consists of the 1$^{st}$ linear low density polyethylene (LLDPE1). In another specific preferred embodiment the 1$^{st}$ base polymer composition (BC1) consists of the 1$^{st}$ linear low density polyethylene (LLDPE1) and the 1$^{st}$ low density polyethylene (LDPE1). In such a case it is preferred that the 1$^{st}$ base polymer composition (BC1) consists of
(a) 70 to 98 wt.-%, preferably 75 to 95 wt.-%, still more preferably 80 to 92 wt.-%, based on the total weight of the 1$^{st}$ base polymer composition (BC1), of the 1$^{st}$ linear low density polyethylene (LLDPE1),
and
(b) 2 to 30 wt.-%, preferably 5 to 25 wt.-%, still more preferably 8 to 20 wt.-%, based on the total weight of the 1$^{st}$ base polymer composition (BC1), of the 1$^{st}$ low density polyethylene (LDPE1).

The 1$^{st}$ linear low density polyethylene (LLDPE1) has a density in the range of 0.890 to 0.925 g/cm$^3$, more preferably in the range of 0.900 to 0.925 g/cm$^3$, yet more preferably in the range of 0.910 to 0.923 g/cm$^3$, still more preferably has a density in the range of 0.915 to 0.922 g/cm$^3$.

The 1$^{st}$ linear low density polyethylene (LLDPE1) contains at least one comonomer, preferably only one or two comonomer(s), the latter being especially preferred. That comonomer(s) is/are preferably (a) C$_3$ to C$_{10}$ α-olefin comonomer(s). Therefore the use of copolymers with just one comonomer or terpolymers, i.e. copolymers of ethylene with two further comonomers, is particularly preferred. Said terpolymer is one specific preferred 1$^{st}$ linear low density polyethylene (LLDPE1). Hence, the 1$^{st}$ linear low density polyethylene (LLDPE1) contains preferably just one or two type(s) of C$_3$ to C$_{10}$ α-olefin comonomer(s). Still more preferably, the comonomer(s) is/are selected from the group consisting of 1-butene, 1-hexene, 1-octene and mixtures thereof. In one preferred embodiment the comonomer employed is 1-octene. In another preferred embodiment the 1$^{st}$ linear low density polyethylene (LLDPE1) is a terpolymer consisting of ethylene, 1-butene and 1-hexene.

The amount of α-olefin comonomer(s) present in the 1$^{st}$ linear low density polyethylene (LLDPE1) can range from 1.0 to 10 mol.-%, such as 1.5 to 5.0 mol.-%, like 2.0 to 4.0 mol.-%. In case the 1$^{st}$ linear low density polyethylene (LLDPE1) is a terpolymer consisting of ethylene, 1-butene and 1-hexene it is preferred that the 1-butene content is in the 0.1 to 1.0 mol.-% and the 1-hexene content in the range of 2.0 to 3.5 mol.-%.

Further it is preferred that the 1$^{st}$ linear low density polyethylene (LLDPE1) has a melt flow rate MFR$_2$ (190° C., 2.16 kg) in the range of 0.5 to 8.0 g/10 min, more preferably in the range of 0.8 to 4.0 g/10 min, like in the range of 1.0 to 2.5 g/10 min.

The 1$^{st}$ linear low density polyethylene (LLDPE1) is known in the art and not subject of the invention. Reference is made in this regard especially to EP 3 257 895 A1, e.g. example IE1 of EP 3 257 895 A1.

In case a low density polyethylene is part of the 1$^{st}$ base polymer composition (BC1) it is preferably the 1$^{st}$ low density polyethylene (LDPE1) coming from a high-pressure polymerization process and having a density in the range of 0.910 to 0.940 g/cm$^3$, more preferably in the range of 0.915 to 0.935 g/cm$^3$, still more preferably in the range of 0.918 to 0.930 g/cm$^3$.

Further it is preferred that the 1$^{st}$ low density polyethylene (LDPE1) has a melt flow rate MFR$_2$ (190° C., 2.16 kg) in the range of 0.05 to 2.0 g/10 min, more preferably in the range of 0.10 to 1.5 g/10 min, like in the range of 0.15 to 1.0 g/10 min.

The 1$^{st}$ low density polyethylene (LDPE1) is known in the art and not subject of the invention. Accordingly, one example of such low density polyethylene (LDPE1) is the commercial product FT5230 of Borealis AG.

In case the 1$^{st}$ base polymer composition (BC1) comprises in addition to the 1$^{st}$ linear low density polyethylene (LLDPE1) other polymers, like the 1$^{st}$ low density polyethylene (LDPE1), the 1$^{st}$ base polymer composition (BC1) is obtained by typical (melt) blending as known in the art.

3rd Base Polymer Composition (BC3)

As mentioned above outer layer (OL) must contain a 3rd base polymer composition (BC3) which contains at least 90 wt.-%, based on the total weight of the 3rd base polymer composition (BC3), of a polyolefin. Further, like for the 1st and 2nd base polymer compositions (BC1) and (BC2), the term "3rd base polymer composition (BC3)" indicates that said composition contains just polymers, preferably just polyolefins.

In preferred embodiments the outer layer (OL) is either a heat shield layer (HSL) or a 2nd sealing layer (SL2), the latter being preferred.

In case the outer layer (OL) is a heat shield layer (HSL), said heat shield layer (HSL) is based on a 3rd base polymer composition (BC3B). Preferably said 3rd base polymer composition (BC3B) comprises at least 90 wt.-%, still more preferably at least 95 wt.-%, yet more preferably at least 98 wt.-%, based on the total weight of the 3rd base polymer composition (BC3B), of a polypropylene being
  (a) a propylene homopolymer (H-PP) having a melting temperature of at least 158° C.;
or
  (b) a propylene copolymer (R-PP) having
    (i) a melting temperature of at least 150° C. and
    (ii) a comonomer content, preferably ethylene content, of not more than 3.5 wt.-%.

Preferably the polypropylene is a propylene homopolymer (H-PP).

Further it is preferred that the propylene homopolymer (H-PP) or propylene copolymer (R-PP) has a melt flow rate MFR2 (230° C., 2.16 kg) in the range of 0.5 to 20.0 g/10 min, more preferably in the range of 0.5 to 10.0 g/10 min.

In case the outer layer (OL) is a 2nd sealing layer (SL2), said 2nd sealing layer (SL2) is based on a 3rd base polymer composition (BC3A).

The term "3rd base polymer composition (BC3A)" indicates that said composition contains just polymers, preferably just polyolefins, still more preferably just polyethylenes. One of the polymers must be the 2nd linear low density polyethylene (LLDPE2) as defined in more detail below. Accordingly it is preferred that 3rd base polymer composition (BC3A) comprises at least 70 wt.-%, more preferably at least 75 wt.-%, still more preferably at least 80 wt.-%, based on the total weight of the 3rd base polymer composition (BC3A), of the 2nd linear low density polyethylene (LLDPE2) and the remaining part up to 100 wt.-%, based on the total weight of the 3rd base polymer composition (BC3A), are polymers, preferably polyolefins, more preferably polyethylenes, like the 2nd low density polyethylene (LDPE2) as defined in detail below.

Accordingly in one preferred embodiment the 3rd base polymer composition (BC3A) consists of the 2nd linear low density polyethylene (LLDPE2). In another specific preferred embodiment the 3rd base polymer composition (BC3A) consists of the 2nd linear low density polyethylene (LLDPE2) and the 2nd low density polyethylene (LDPE2). In such a case it is preferred that the 3rd base polymer composition (BC3A) consists of
  (a) 70 to 98 wt.-%, preferably 75 to 95 wt.-%, still more preferably 80 to 92 wt.-%, based on the total weight of the 3rd base polymer composition (BC3A), of the 2nd linear low density polyethylene (LLDPE2), and
  (b) 2 to 30 wt.-%, preferably 5 to 25 wt.-%, still more preferably 8 to 20 wt.-%, based on the total weight of the 3rd base polymer composition (BC3A), of the 2nd low density polyethylene (LDPE2).

The 2nd linear low density polyethylene (LLDPE2) has a density in the range of 0.890 to 0.925 g/cm$^3$, more preferably in the range of 0.900 to 0.925 g/cm$^3$, yet more preferably in the range of 0.910 to 0.923 g/cm$^3$, still more preferably has a density in the range of 0.915 to 0.922 g/cm$^3$.

The 2nd linear low density polyethylene (LLDPE2) contains at least one comonomer, preferably only one or two comonomer(s), the latter especially preferred. That comonomer(s) is/are preferably (a) $C_3$ to $C_{10}$ α-olefin comonomer(s). Therefore the use of copolymers with just one comonomer or terpolymers, i.e. copolymers of ethylene with two further comonomers, is particularly preferred. Said terpolymer is one specific preferred 2nd linear low density polyethylene (LLDPE2). Hence the 2nd linear low density polyethylene (LLDPE2) contains preferably just one or two type(s) of $C_3$ to $C_{10}$ α-olefin comonomer(s). Still more preferably the comonomer(s) is/are selected from the group consisting of 1-butene, 1-hexene, 1-octene and mixtures thereof. In one preferred embodiment the comonomer employed is 1-octene. In another preferred embodiment the 2nd linear low density polyethylene (LLDPE2) is a terpolymer consisting of ethylene, 1-butene and 1-hexene.

The amount of α-olefin comonomer(s) present in the 2nd linear low density polyethylene (LLDPE2) can range from 1.0 to 10 mol.-%, such as 1.5 to 5.0 mol.-%, like 2.0 to 4.0 mol.-%. In case the 2nd linear low density polyethylene (LLDPE2) is a terpolymer consisting of ethylene, 1-butene and 1-hexene it is preferred that the 1-butene content is in the 0.1 to 1.0 mol.-% and the 1-hexene content in the range of 2.0 to 3.5 mol.-%.

Further it is preferred that the 2nd linear low density polyethylene (LLDPE2) has a melt flow rate MFR2 (190° C., 2.16 kg) in the range of 0.5 to 8.0 g/10 min, more preferably in the range of 0.8 to 4.0 g/10 min, like in the range of 1.0 to 2.5 g/10 min.

The 2nd linear low density polyethylene (LLDPE2) is known in the art and not subject of the invention. Reference is made in this regard especially to EP 3 257 895 A1, e.g. example IE1 of EP 3 257 895 A1.

Preferably the 2nd linear low density polyethylene (LLDPE2) is chemically identical to the 1 linear low density polyethylene (LLDPE1) as defined above.

In case a low density polyethylene is part of the 3rd base polymer composition (BC3A) it is preferably the 2nd low density polyethylene (LDPE2) coming from a high-pressure polymerization process and having a density in the range of 0.910 to 0.940 g/cm$^3$, more preferably in the range of 0.915 to 0.935 g/cm$^3$, still more preferably in the range of 0.918 to 0.930 g/cm$^3$.

Further it is preferred that the 2nd low density polyethylene (LDPE2) has a melt flow rate MFR$_2$ (190° C., 2.16 kg) in the range of 0.05 to 2.0 g/10 min, more preferably in the range of 0.10 to 1.5 g/10 min, like in the range of 0.15 to 1.0 g/10 min.

The 2nd low density polyethylene (LDPE2) is known in the art and not subject of the invention. Accordingly one example of such low density polyethylene (LDPE1) is the commercial product FT5230 of Borealis AG.

Preferably the 2nd low density polyethylene (LDPE2) is chemically identical to the 1st low density polyethylene (LDPE1) as defined above.

Still more preferably the 3rd base polymer composition (BC3A) is chemically identical to the 1st base polymer composition (BC1).

In case the 3rd base polymer composition (BC3) comprises different polymers, like different polyolefins, the 3rd base polymer composition (BC3) is obtained by typical (melt) blending as known in the art. For instance in case the 3$^{rd}$ base polymer composition (BC3A) comprises in addition to the 2$^{nd}$ linear low density polyethylene (LLDPE2) other polymers, like the 2$^{nd}$ low density polyethylene (LDPE2), the 3$^{rd}$ base polymer composition (BC3A) is obtained by typical (melt) blending as known in the art.

In the following the present invention is further illustrated by means of examples.

EXAMPLES

1. Definitions/Measuring Methods

The following definitions of terms and determination methods apply for the above general description of the invention as well as to the below examples unless otherwise defined.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR$_2$ of polypropylene is determined at a temperature of 230° C. and a load of 2.16 kg. The MFR$_2$ of polyethylene is determined at a temperature of 190° C. and a load of 2.16 kg.

Calculation of melt flow rate MFR$_2$ (230° C.) of the propylene 1-hexene copolymer (PHC-2):

$$MFR(B) = 10^{\left[\frac{\log(MFR(P)) - w(A) \times \log(MFR(A))}{w(B)}\right]}$$

wherein w(A) is the weight fraction of the propylene 1-hexene copolymer (PHC-1);

w(B) is the weight fraction of propylene 1-hexene copolymer (PHC-2);

MFR(A) is the melt flow rate MFR$_2$ (230° C.) [in g/10 min] measured according ISO 1133 of the propylene 1-hexene copolymer (PHC-1);

MFR(P) is the melt flow rate MFR$_2$ (230° C.) [in g/10 min] measured according ISO 1133 of the propylene 1-hexene copolymer (PHC);

MFR(B) is the calculated melt flow rate MFR$_2$ (230° C.) [in g/10 min] of the propylene 1-hexene copolymer (PHC-2).

Mw, Mn, MWD

Mw/Mn/MWD are measured by Gel Permeation Chromatography (GPC) according to the following method:

The weight average molecular weight (Mw), the number average molecular weight (Mn), and the molecular weight distribution (MWD=Mw/Mn) is measured by a method based on ISO 16014-1:2003 and ISO 16014-4:2003. A Waters Alliance GPCV 2000 instrument, equipped with refractive index detector and online viscosimeter is used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution are injected per analysis. The column set is calibrated using relative calibration with 19 narrow MWD polystyrene (PS) standards in the range of 0.5 kg/mol to 11 500 kg/mol and a set of well characterized broad polypropylene standards. All samples are prepared by dissolving 5 to 10 mg of polymer in 10 mL (at 160° C.) of stabilized TCB (same as mobile phase) and keeping for 3 hours with continuous shaking prior sampling in into the GPC instrument.

Comonomer content of 1-hexene for a propylene 1-hexene copolymer (PHC) Quantitative $^{13}$C {$^1$H} NMR spectra recorded in the molten-state using a Bruker Avance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382., Parkinson, M., Klimke, K., Spiess, H. W., Wilhelm, M., Macromol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the NOE at short recycle delays of 3 s (Klimke, K., Parkinson, M., Piel, C., Kaminsky, W., Spiess, H. W., Wilhelm, M., Macromol. Chem. Phys. 2006; 207: 382., Pollard, M., Klimke, K., Graf, R., Spiess, H. W., Wilhelm, M., Sperber, O., Piel, C., Kaminsky, W., Macromolecules 2004; 37:813.), and the RS-HEPT decoupling scheme (Filip, X., Tripon, C., Filip, C., J. Mag. Resn. 2005, 176, 239., Griffin, J. M., Tripon, C., Samoson, A., Filip, C., and Brown, S. P., Mag. Res. in Chem. 2007 45, S1, S198). A total of 16384 (16k) transients were acquired per spectra.

Quantitative $^{13}$C {$^1$H} NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$H = I\alpha B4/2$

The amount of 1-hexene incorporated in PHHP double consecutive sequences was quantified using the integral of the ααB4 site at 41.7 ppm accounting for the number of reporting sites per comonomer:

$HH = 2*I\alpha\alpha B4$

When double consecutive incorporation was observed the amount of 1-hexene incorporated in PHP isolated sequences needed to be compensated due to the overlap of the signals αB4 and αB4B4 at 44.4 ppm:

$H = (I\alpha B4 - 2*I\alpha\alpha B4)/2$

The total 1-hexene content was calculated based on the sum of isolated and consecutively incorporated 1-hexene:

$H\text{total} = H + HH$

When no sites indicative of consecutive incorporation observed the total 1-hexeen comonomer content was calculated solely on this quantity:

$H\text{total} = H$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the αα21e9 methylene site at 42.4 ppm:

$$P21 = I_{\alpha\alpha21e9}$$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$$P12 = I_s\alpha\alpha + 2*P21 + H + HH/2$$

The total amount of propene was quantified as the sum of primary (1,2) and secondary (2,1-erythro) inserted propene:

$$P\text{total} = P12 + P21 = I_s\alpha\alpha + 3*I\alpha\alpha21e9 + (I\alpha B4 - 2*I\alpha\alpha B4)/2 + I\alpha\alpha B4$$

This simplifies to:

$$P\text{total} = I_s\alpha\alpha + 3*I\alpha\alpha21e9 + 0.5*I\alpha B4$$

The total mole fraction of 1-hexene in the polymer was then calculated as:

$$fH = H\text{total}/(H\text{total} + P\text{total})$$

The full integral equation for the mole fraction of 1-hexene in the polymer was:

$$fH = (((I\alpha B4 - 2*I\alpha\alpha B4)/2) + (2*I\alpha\alpha B4))/((I_s\alpha\alpha + 3*I\alpha\alpha21e9 + 0.5*I\alpha B4) + ((I\alpha B4 - 2*I\alpha\alpha B4)/2) + (2*I\alpha\alpha B4))$$

This simplifies to:

$$fH = (I\alpha B4/2 + I\alpha\alpha B4)/(I_s\alpha\alpha + 3*I\alpha\alpha21e9 + I\alpha B4 + I\alpha\alpha B4)$$

The total comonomer incorporation of 1-hexene in mole percent was calculated from the mole fraction in the usual manner:

$$H[\text{mol \%}] = 100*fH$$

The total comonomer incorporation of 1-hexene in weight percent was calculated from the mole fraction in the standard manner:

$$H[\text{wt \%}] = 100*(fH*84.16)/((fH*84.16) + ((1-fH)*42.08))$$

Calculation of 1-hexene content of the propylene 1-hexene copolymer (PHC-2):

$$\frac{C(PHC) - w(P) \times C(A)}{w(B)} = C(B)$$

wherein w(A) is the weight fraction of the propylene 1-hexene copolymer (PHC-1);
w(B) is the weight fraction of the propylene 1-hexene copolymer (PHC-2);
C(A) is the 1-hexene content [in wt.-%] measured by $^{13}$C NMR spectroscopy of the propylene 1-hexene copolymer (PHC-1);
C(PHC) is the 1-hexene content [in wt.-%] measured by $^{13}$C NMR spectroscopy of the propylene 1-hexene copolymer (PHC);
C(B) is the calculated 1-hexene content [in wt.-%] measured by $^{13}$C NMR spectroscopy of the propylene 1-hexene copolymer (PHC-2);

Comonomer Content of 1-Octene of a Linear Low Density Polyethylene (LLDPE)

Quantitative nuclear-magnetic resonance (NMR) spectroscopy was used to quantify the comonomer content of the polymers.

Quantitative $^{13}$C{$^1$H} NMR spectra recorded in the molten-state using a Bruker Avance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification (Klimke, K., Parkinson, M., Piel, C., Kaminsky, W., Spiess, H. W., Wilhelm, M., Macromol. Chem. Phys. 2006; 207:382.; Parkinson, M., Klimke, K., Spiess, H. W., Wilhelm, M., Macromol. Chem. Phys. 2007; 208:2128.; Castignolles, P., Graf, R., Parkinson, M., Wilhelm, M., Gaborieau, M., Polymer 50 (2009) 2373; NMR Spectroscopy of Polymers: Innovative Strategies for Complex Macromolecules, Chapter 24, 401 (2011)). Standard single-pulse excitation was employed utilising the transient NOE at short recycle delays of 3 s (Pollard, M., Klimke, K., Graf, R., Spiess, H. W., Wilhelm, M., Sperber, O., Piel, C., Kaminsky, W., Macromolecules 2004; 37:813.; Klimke, K., Parkinson, M., Piel, C., Kaminsky, W., Spiess, H. W., Wilhelm, M., Macromol. Chem. Phys. 2006; 207:382.) and the RS-HEPT decoupling scheme (Filip, X., Tripon, C., Filip, C., J. Mag. Resn. 2005, 176, 239.; Griffin, J. M., Tripon, C., Samoson, A., Filip, C., and Brown, S. P., Mag. Res. in Chem. 2007 45, S1, S198). A total of 1024 (1k) transients were acquired per spectrum. This setup was chosen due its high sensitivity towards low comonomer contents.

Quantitative $^{13}$C{$^1$H} NMR spectra were processed, integrated and quantitative properties determined using custom spectral analysis automation programs. All chemical shifts are internally referenced to the bulk methylene signal (δ+) at 30.00 ppm (J. Randall, Macromol. Sci., Rev. Macromol. Chem. Phys. 1989, C29, 201.).

Characteristic signals corresponding to the incorporation of 1-octene were observed (J. Randall, Macromol. Sci., Rev. Macromol. Chem. Phys. 1989, C29, 201.; Liu, W., Rinaldi, P., McIntosh, L., Quirk, P., Macromolecules 2001, 34, 4757; Qiu, X., Redwine, D., Gobbi, G., Nuamthanom, A., Rinaldi, P., Macromolecules 2007, 40, 6879) and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.37 ppm. This integral is assigned to the unresolved signals corresponding to both $_*B6$ and $_*\beta B6B6$ sites of isolated (EEOEE) and isolated double non-consecutive (EEOEOEE) 1-octene sequences respectively. To compensate for the influence of the two $_*\beta B6B6$ sites the integral of the $\beta\beta B6B6$ site at 24.7 ppm is used:

$$O = I_{*B6 + *\beta B6B6} - 2*I_{\beta\beta B6B6}$$

Characteristic signals resulting from consecutive 1-octene incorporation, i.e. EEOOEE comonomer sequences, were also observed. Such consecutive 1-octene incorporation was quantified using the integral of the signal at 40.57 ppm assigned to the ααB6B6 sites accounting for the number of reporting sites per comonomer:

$$OO = 2*I_{\alpha\alpha B6B6}$$

Characteristic signals resulting from isolated non-consecutive 1-octene incorporation, i.e. EEOEOEE comonomer sequences, were also observed. Such isolated non-consecutive 1-octene incorporation was quantified using the integral of the signal at 24.7 ppm assigned to the ββB6B6 sites accounting for the number of reporting sites per comonomer:

$$OEO = 2*I_{\beta\beta B6B6}$$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the ααγB6B6B6 sites accounting for the number of reporting sites per comonomer:

$$OOO = 3/2*I_{\alpha\alpha\gamma B6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total} = O + OO + OEO + OOO$$

Characteristic signals resulting from saturated end-groups were observed. Such saturated end-groups were quantified using the average integral of the two resolved signals at 22.84 and 32.23 ppm. The 22.84 ppm integral is assigned to the unresolved signals corresponding to both 2B6 and 2S sites of 1-octene and the saturated chain end respectively. The 32.23 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S = (1/2)*(I_{2S+2B6} + I_{3S+3B6} - 2*O_{total})$$

The ethylene comonomer content was quantified using the integral of the bulk methylene (bulk) signals at 30.00 ppm. This integral included the γ and 4B6 sites from 1-octene as well as the δ+ sites. The total ethylene comonomer content was calculated based on the bulk integral and compensating for the observed 1-octene sequences and end-groups:

$$E_{total} = (1/2)*[I_{bulk} + 2*O + 1*OO + 3*OEO + 0*OOO + 3*S]$$

It should be noted that compensation of the bulk integral for the presence of isolated triple-incorporation (EEOOOEE) 1-octene sequences is not required as the number of under and over accounted ethylene units is equal.

The total mole fraction of 1-octene in the polymer was then calculated as:

$$fO = (O_{total}/(E_{total} + O_{total}))$$

The total comonomer incorporation of 1-octene in mol percent was calculated from the mole fraction in the standard manner:

$$O[mol\%] = 100*fO$$

The mole percent ethylene incorporation was calculated from the formula:

$$E[mol\%] = 100 - O[mol\%].$$

Comonomer Content of 1-Butene and 1-Hexene of a Linear Low Density Polyethylene (LLDPE)

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification (Klimke, K., Parkinson, M., Piel, C., Kaminsky, W., Spiess, H. W., Wilhelm, M., Macromol. Chem. Phys. 2006; 207:382., Parkinson, M., Klimke, K., Spiess, H. W., Wilhelm, M., Macromol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the transient NOE at short recycle delays of 3 s (Pollard, M., Klimke, K., Graf, R., Spiess, H. W., Wilhelm, M., Sperber, O., Piel, C., Kaminsky, W., Macromolecules 2004; 37:813., Klimke, K., Parkinson, M., Piel, C., Kaminsky, W., Spiess, H. W., Wilhelm, M., Macromol. Chem. Phys. 2006; 207:382.) and the RS-HEPT decoupling scheme (Filip, X., Tripon, C., Filip, C., J. Mag. Resn. 2005, 176, 239, Griffin, J. M., Tripon, C., Samoson, A., Filip, C., and Brown, S. P., Mag. Res. in Chem. 2007 45, S1, S198). A total of 1024 (1k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm (J. Randall, Macromol. Sci., Rev. Macromol. Chem. Phys. 1989, C29, 201).

The amount of ethylene was quantified using the integral of the methylene (δ+) sites at 30.00 ppm accounting for the number of reporting sites per monomer:

$$E = I_{\delta+}/2$$

the presence of isolated comonomer units is corrected for based on the number of isolated comonomer units present:

$$Etotal = E + (3*B + 2*H)/2$$

where B and H are defined for their respective comonomers. Correction for consecutive and non-consecutive comonomer incorporation, when present, is undertaken in a similar way. Characteristic signals corresponding to the incorporation of 1-butene were observed (J. Randall, Macromol. Sci., Rev. Macromol. Chem. Phys. 1989, C29, 201.) and all contents calculated with respect to all other monomers present in the polymer.

The amount isolated 1-butene incorporated in EEBEE sequences was quantified using the integral of the *B2 sites at 38.3 ppm accounting for the number of reporting sites per comonomer:

$$B = I_{*B2}$$

The amount consecutively incorporated 1-butene in EEBBEE sequences was quantified using the integral of the ααB2B2 site at 39.4 ppm accounting for the number of reporting sites per comonomer:

$$BB = 2*I_{\alpha\alpha B2B2}$$

The amount non consecutively incorporated 1-butene in EEBEBEE sequences was quantified using the integral of the ββB2B2 site at 24.7 ppm accounting for the number of reporting sites per comonomer:

$$BEB=2*I_{\beta\beta B2B2}$$

Due to the overlap of the *B2 and *βB2B2 sites of isolated (EEBEE) and non-consecutively incorporated (EEBEBEE) 1-butene respectively the total amount of isolated 1-butene incorporation is corrected based on the amount of non-consecutive 1-butene present:

$$B=I_{*B2}-2*I_{\beta\beta B2B2}$$

The total 1-butene content was calculated based on the sum of isolated, consecutive and non consecutively incorporated 1-butene:

$$Btotal=B+BB+BEB$$

The total mole fraction of 1-butene in the polymer was then calculated as:

$$fB=(Btotal)/(Etotal+Btotal+Htotal)$$

Characteristic signals corresponding to the incorporation of 1-hexene were observed (J. Randall, Macromol. Sci., Rev. Macromol. Chem. Phys. 1989, C29, 201.) and all contents calculated with respect to all other monomers present in the polymer.

The amount isolated 1-hexene incorporated in EEHEE sequences was quantified using the integral of the $_*B4$ sites at 39.9 ppm accounting for the number of reporting sites per comonomer:

$$H=I_{*B4}$$

The amount consecutively incorporated 1-hexene in EEHHEE sequences was quantified using the integral of the ααB4B4 site at 40.5 ppm accounting for the number of reporting sites per comonomer:

$$HH=2*I_{\alpha\alpha B4B4}$$

The amount non consecutively incorporated 1-hexene in EEHEHEE sequences was quantified using the integral of the ββB4B4 site at 24.7 ppm accounting for the number of reporting sites per comonomer:

$$HEH=2*I_{\beta\beta B4B4}$$

Due to overlap of the ββB2B2 sites of non-consecutively incorporated (EEBEBEE) 1-butene and ββB4B4 sites of non-consecutively incorporated (EEHEHEE) 1-hexene the total amount of non-consecutive incorporation (EEBEBEE) 1-butene was assumed to be proportional to the amount of isolated 1-butene (B) insertion and the total amount of non-consecutive incorporation (EEHEHEE) 1-hexene was assumed to be proportional to the amount of isolated 1-hexene (H).

The total mole fraction of 1-hexene in the polymer was then calculated as:

$$fH=(Htotal)/(Etotal+Btotal+Htotal)$$

The mole percent comonomer incorporation is calculated from the mole fraction:

$$B[mol\%]=100*fB$$

$$H[mol\%]=100*fH$$

The weight percent comonomer incorporation is calculated from the mole fraction:

$$B[wt\%]=100*(fB*56.11)/((fB*56.11)+(fH*84.16)+((1-(fB+fH))*28.05))$$

$$H[wt\%]=100*(fH*84.16)/((fB*56.11)+(fH*84.16)+((1-(fB+fH))*28.05))$$

Density is measured according to ISO 1183-187. Sample preparation is done by compression moulding in accordance with ISO 1872-2:2007.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and melt enthalpy ($H_m$) are determined from the second heating step.

Dynamic Mechanical Thermal Analysis (DMTA)

The glass transition temperature Tg is determined by dynamic mechanical thermal analysis (DMTA) according to ISO 6721-7. The measurements are done in torsion mode on compression moulded samples (40×10×1 mm$^3$) between −100° C. and +150° C. with a heating rate of 2° C./min and a frequency of 1 Hz. Storage modulus G' is determined at +23° C. according ISO 6721-7:1996. The measurements are done in torsion mode on compression moulded samples (40×10×1 mm$^3$) between −150° C. and +150° C. with a heating rate of 2° C./min and a frequency of 1 Hz.

Xylene Cold Soluble (XCS) Content

Xylene Cold Soluble fraction at room temperature (XCS, wt %) is determined at 25° C. according to ISO 16152; 5th edition; 2005 Jul. 1.

Tensile Modulus

Tensile modulus in machine and transverse direction were determined according to ISO 527-3 at 23° C. on the multilayer films as produced indicated below. Testing was performed at a cross head speed of 1 mm/min.

Dart Drop Strength (DDI)

Dart-drop is measured using ASTM D1709, method A (Alternative Testing Technique) from the multilayer films as produced indicated below. A dart with a 38 mm diameter hemispherical head is dropped from a height of 0.66 m onto a multilayer film clamped over a hole. Successive sets of twenty specimens are tested. One weight is used for each set and the weight is increased (or decreased) from set to set by uniform increments. The weight resulting in failure of 50% of the specimens is calculated and reported.

Haze and clarity were determined according to ASTM D 1003-00 on multilayer films as produced indicated below.

Sealing Initiation Temperature (SIT)

The heat scaling initiation temperature (SIT) is the scaling temperature at which a scaling strength of >5 N is achieved.

The sealing range is determined on a J&B Universal Sealing Machine Type 3000 of the multilayer films as produced indicated below with the following parameters:
Specimen width: 25.4 mm
Seal Pressure: 0.1 N/mm$^2$
Seal Time: 0.1 sec
Cool time: 99 sec
Peel Speed: 10 mm/sec
Start temperature 80° C.
End temperature: 150° C.
Increments: 10° C.
specimen is sealed A to A at each seal bar temperature and seal strength (force) is determined at each step.

The temperature is determined at which the seal strength reaches 5 N.

Hot Tack Force:

The hot tack force is determined on a DTC Hot tack tester Model 52-F/201 with the films as defined below with the following further parameters:

Specimen width: 25 mm
Seal Pressure: 1.2 N/mm$^2$
Seal Time: 0.5 sec
Cool time: 0.2 see
Peel Speed: 200 mm/sec
Start temperature: 90° C.
End temperature: 140° C.

The maximum hot tack force, i.e the maximum of a force/temperature diagram is determined and reported.

2. Examples

Preparation of the Catalyst System for the Inventive Examples

The catalyst used in the inventive example is prepared as described in detail in WO 2015/011135 A1 (metallocene complex MCI with methylaluminoxane (MAO) and borate resulting in Catalyst 3 described in WO 2015/011135 A1) with the proviso that the surfactant is 2,3,3,3-tetrafluoro-2-(1,1,2,2,3,3,3-heptafluoropropoxy)-1-propanol. The metallocene complex (MCi in WO 2015/011135 A1) is prepared as described in WO 2013/007650 A1 (metallocene E2 in WO 2013/007650 A1).

Polymerization and Pelletization

Polymer PH1 is produced in a Borstar pilot plant comprising a prepolymerisation reactor, a loop reactor and a gas phase reactor. The polymerisation conditions are indicated in Table 1. PH1 is the basis of the Inventive Examples.

Polymer PH1 was compounded in a co-rotating twin-screw extruder Coperion ZSK 57 at 220° C. with 0.2 wt % of Irganox B225 (1:1-blend of Irganox 1010 (Pentaerythrityl-5 tetrakis(3-(3',5'-di-tert.butyl-4-hydroxytoluyl)-propionate and tris(2,4-di-t-butylphenyl) phosphate) phosphite) of BASF AG, Germany) and 0.1 wt % calcium stearate followed by solidification of the resulting melt strands in a water bath and pelletization.

Compounding of Material (M1) for the Sealing Layers (SL1) and (SL2)

Melt mixing was performed in a Thermo Fisher (PRISM) TSE 24 twin-screw extruder at 220° C. followed by solidification of the resulting melt strands in a water bath and pelletization. 90 wt.-% of the linear low density polyethylene "LLDPE" was mixed with 10 wt.-% of the low density polyethylene "FT5230" of Borealis AG.

The linear low density polyethylene "LLDPE" is example IE1 of EP 3 257 895 A1 having a 1-butene content of 0.3 mol.-%, a 1-hexene content of 2.6 mol.-%, density of 0.918 g/cm$^3$ and a melt flow rate MFR$_2$ (190° C., 2.16 kg) of 1.5 g/10 min;

The low density polyethylene "FT5230" of Borealis AG has a density of 923 g/cm$^3$ and a melt flow rate MFR$_2$ (190° C., 2.16 kg) of 0.75 g/10 min;

Compounding of Material (M2) for the Core Layer (CL)

Melt mixing was performed in a Thermo Fisher (PRISM) TSE 24 twin-screw extruder at 220° C. followed by solidification of the resulting melt strands in a water bath and pelletization. 90 wt.-% of the propylene 1-hexene copolymer PH1 (see comments above and table 1 below) was mixed with 10 wt.-% of the plastomer (PL) which is the commercial ethylene 1-octene plastomer "Queo 8201" of Borealis AG having a melt flow rate (190° C., 2.16 kg) of 1.1 g/10 min, a density of 0.882 g/cm$^3$, an 1-octene content of 24.5 wt.-%, a melting temperature of 72° C. and a glass transition temperature of −52° C.

TABLE 1

Polymerization details of polymer PH 1

|  |  | PH1 |
|---|---|---|
| Prepolymerization |  |  |
| Temperature | [° C.] | 20 |
| Pressure | [kPa] | 5247 |
| Residence time | [h] | 0.4 |
| Loop reactor |  |  |
| Temperature | [° C.] | 70 |
| Pressure | [kPa] | 5241 |
| H2/C3 ratio | [mol/kmol] | 0.1 |
| C6/C3 ratio | [mol/kmol] | 7.2 |
| Residence time | [h] | 0.4 |
| C6 | [wt %] | 1.3 |
| MFR | [g/10 min] | 1.1 |
| Split | [wt %] | 41 |
| Gas phase reactor |  |  |
| Temperature | [° C.] | 80 |
| Pressure | [kPa] | 2500 |
| H2/C3 ratio | [mol/kmol] | 1.7 |
| C6/C3 ratio | [mol/kmol] | 7.0 |
| C6(GPR) | [wt %] | 4.5 |
| MFR(GPR) | [g/10 min] | 1.9 |
| Residence time | [h] | 1.8 |
| Split | [wt %] | 59 |
| Product |  |  |
| C6 total | [wt %] | 3.2 |
| XCS | [wt %] | 0.7 |
| C6 of XCS | [wt %] | 4.3 |
| 2, 1e | [mol. −%] | 0.47 |
| MWD | [−] | 3.7 |
| MFR | [g/10 min] | 1.5 |
| Tc | [° C.] | 94 |
| Tm | [° C.] | 136 |

Three layer blown polymer films were produced on a three layer blown film line. The melt temperature of the sealing layers (SL1) and (SL2) was 185° C. to 195° C. The melt temperature of the core layer (CL) was in the range of 205° C. to 215° C. The throughput of the extruders was in sum 80 kg/h. The film structure was SL1-CL-SL2 with a core layer of 25 μm (CL) and two sealing layers (SL1) and (SL2) of 12.5 m. Layer thickness has been determined by Scanning Electron Microscopy. The material used for the layers multilayer films is indicated in the table 2. The properties of the multilayer films are indicated in table 3.

TABLE 2

Layer structure of the multilayer films

|  | Thickness | CE1 | IE1 | IE2 |
|---|---|---|---|---|
| SL1 | 12.5 μm | M1 | M1 | M1 |
| CL | 25 μm | FX | PH1 | M2 |
| SL2 | 12.5 μm | M1 | M1 | M1 |

"FX" is the linear low density polyethylene "FX1001" of Borealis AG having a density of 0.933 g/cm$^3$, a melting temperature of 127° C. and a melt flow rate MFR$_5$ (190° C., 5 kg) of 0.85 g/10 min.

TABLE 3

Properties of the multilayer films

|  |  | CE1 | IE1 | IE2 |
|---|---|---|---|---|
| Haze* | [%] | 6.93 | 4.11 | 4.06 |
| Clarity* | [%] | 95.6 | 99.6 | 99.7 |
| TM/MD | [MPa] | 324 | 566 | 500 |
| TM/TD | [MPa] | 396 | 595 | 516 |
| DDI | [g] | 608 | 430 | 674 |
| SIT | [° C.] | 87 | 84 | 83 |
| HTF | [N] | 5.7 | 7.4 | 4.8 |

*before sterilization

The invention claimed is:

1. Base polymer composition (BPC) comprising:
(a) 75 to 95 wt. %, based on the total weight of the base polymer composition (BPC), of a propylene 1-hexene copolymer (PHC) comprising a $1^{st}$ propylene 1-hexene copolymer (PHC-1) and a $2^{nd}$ propylene 1-hexene copolymer (PHC-2), and
(b) 5 to 25 wt. %, based on the total weight of the $2^{nd}$ base polymer composition (BC2), of a plastomer (PL) having a density in the range of 0.860 to 0.930 g/cm³ measured according to ISO 1183-187, said plastomer being an elastomeric copolymer of ethylene and at least one $C_4$ to $C_{10}$ α-olefin:

wherein:
(a1) said propylene 1-hexene copolymer (PHC) has an 1-hexene content in the range of 2.0 to 5.0 wt. %, based on the total weight of the propylene 1-hexene copolymer (PHC);
(a2) the propylene 1-hexene copolymer (PHC) has a xylene soluble fraction (XCS) determined at 25° C. according to ISO 16152 in the range of 0.3 to 15.0 wt. %, based on the total weight of the xylene soluble fraction (XCS) of the propylene 1-hexene copolymer (PHC);
(a3) said 1st propylene 1-hexene copolymer (PHC-1) has an 1-hexene content in the range of 0.7 to 2.5 wt. % based on the total weight of the $1^{st}$ propylene 1-hexene copolymer (PHC-1);
(a4) said $2^{nd}$ propylene 1-hexene copolymer (PHC-2) has an 1-hexene content in the range of 2.8 to 5.5 wt. % based on the total weight of the $2^{nd}$ propylene 1-hexene copolymer (PHC-2);
(a5) the total amount of the 1st propylene 1-hexene copolymer (PHC-1) and the $2^{nd}$ propylene 1-hexene copolymer (PHC-2) together based on the total weight of the propylene 1-hexene copolymer (PHC) is at least 95 wt. %; and
(a6) the weight ratio [(PHC-1)/(PHC-2)] between the $1^{st}$ propylene 1-hexene copolymer (PHC-1) and the $2^{nd}$ propylene 1-hexene copolymer (PHC-2) is in the range of 30/70 to 50/50; and
wherein the plastomer (PL) has a melt flow rate $MFR_2$ (190° C./2.16 kg) measured according to ISO 1133 in the range of 0.1 to 1.1 g/10 min.

2. The base polymer composition (BPC) according to claim 1, wherein the propylene 1-hexene copolymer (PHC) consists of the propylene 1-hexene copolymers (PHC-1) and (PHC-2).

3. The base polymer composition (BPC) according to claim 1, wherein the propylene 1-hexene copolymer (PHC) has a xylene soluble fraction (XCS) determined at 25° C. according to ISO 16152 in the range of 0.3 to 9.5 wt. % based on the total weight of the xylene soluble fraction (XCS) of the 1-hexene copolymer (PHC).

4. The base polymer composition (BPC) according to claim 1, wherein the propylene 1-hexene copolymer (PHC) has an 1-hexene content in the range of 2.5 to 4.0 wt. %, based on the total weight of the propylene 1-hexene copolymer (PHC).

5. The base polymer composition (BPC) according to claim 1, wherein the propylene 1-hexene copolymer (PHC) has a molecular weight distribution (MWD) in the range of 3.0 to 4.3.

6. The base polymer composition (BPC) according to claim 1, wherein the propylene 1-hexene copolymer (PHC) has 2,1 erythro regio defects in the range of 0.40 to 0.55 mol.-% determined by $^{13}C$ NMR spectroscopy.

7. The base polymer composition (BPC) according to claim 1, wherein the propylene 1-hexene copolymer (PHC) has a melting temperature in the range of 133 to 139° C. measured according to ISO 11357.

8. The base polymer composition (BPC) according to claim 1, wherein the propylene 1-hexene copolymer (PHC) has a melt flow rate $MFR_2$ (230° C./2.16 kg) measured according to ISO 1133 in the range of 0.5 to 8.0 g/10 min.

9. The base polymer composition (BPC) according to claim 1, wherein the plastomer (PL) has a glass transition temperature in the range of −60 to −35° C.

10. The base polymer composition (BPC) according to claim 1, wherein the plastomer (PL) has a density in the range of 0.860 to 0.930 g/cm³ measured according to ISO 1183-187.

11. The base polymer composition (BPC) according to claim 1, wherein the plastomer (PL) has an ethylene content in the range of 65.0 to 95.0 wt. %.

12. The base polymer composition (BPC) according to claim 1, wherein the plastomer (PL) has a melting temperature below 100° C.

13. The base polymer composition (BPC) according to claim 1, wherein the propylene 1-hexene copolymer (PHC) fulfills the inequation (IIc):

$$0.75 \le \frac{C6(PHC-2) * \frac{[PHC-2]}{[PHC]}}{C6(PHC)} \le 0.90$$

wherein
C6 (PHC-2) is the 1-hexene content of the $2^{nd}$ propylene 1-hexene copolymer (PHC-2) based on the total weight of the $2^{nd}$ propylene 1-hexene copolymer (PHC-2) [in wt. %];
C6 (PHC) is the 1-hexene content of the propylene 1-hexene copolymer (PHC) based on the total weight of the propylene 1-hexene copolymer (PHC) [in wt. %];
[PHC-2]/[PHC] is the weight ratio between the $2^{nd}$ propylene 1-hexene copolymer (PHC-2) and the propylene 1-hexene copolymer (PHC) [in g/g].

14. The base polymer composition (BPC) according to claim 1, wherein the propylene 1-hexene copolymer (PHC) fulfills the inequation (I):

$$5.00 \le \frac{C6(PHC)}{C6(PHC-1) * \frac{[PHC-1]}{[PHC]}} \le 7.50 \quad (I)$$

wherein
C6 (PHC-1) is the 1-hexene content of the $1^{st}$ propylene 1-hexene copolymer (PHC-1) based on the total weight of the $1^{st}$ propylene 1-hexene copolymer (PHC-1) [in wt. %];

C6 (PHC) is the 1-hexene content of the propylene 1-hexene copolymer (PHC) based on the total weight of the propylene 1-hexene copolymer (PHC) [in wt. %];

[PHC-1]/[PHC] is the weight ratio between the $1^{st}$ propylene 1-hexene copolymer (PHC-1) and the propylene 1-hexene copolymer (PHC) [in g/g].

* * * * *